(12) United States Patent
Li et al.

(10) Patent No.: US 10,243,439 B2
(45) Date of Patent: Mar. 26, 2019

(54) SINGLE-PHASE OUTER-ROTOR MOTOR AND STATOR THEREOF

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Gang Li, Shenzhen (CN); Yong Li, Shenzhen (CN); Wei Zhang, Shenzhen (CN); Jie Chai, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 252 days.

(21) Appl. No.: 15/148,810

(22) Filed: May 6, 2016

(65) Prior Publication Data

US 2016/0329791 A1    Nov. 10, 2016

(30) Foreign Application Priority Data

May 8, 2015    (CN) .......................... 2015 1 0233218
Sep. 28, 2015    (CN) .......................... 2015 1 0629630

(51) Int. Cl.
| | |
|---|---|
| *H02K 1/06* | (2006.01) |
| *H02K 21/22* | (2006.01) |
| *H02K 1/14* | (2006.01) |
| *H02K 15/02* | (2006.01) |
| *H02K 15/095* | (2006.01) |

(Continued)

(52) U.S. Cl.
CPC .............. *H02K 21/22* (2013.01); *H02K 1/146* (2013.01); *H02K 1/2786* (2013.01); *H02K 3/18* (2013.01); *H02K 15/022* (2013.01); *H02K 15/095* (2013.01); *H02K 2213/03* (2013.01)

(58) Field of Classification Search
CPC ............................... H02K 21/22; H02K 1/146
USPC .... 310/216.091, 216.094, 216.097, 216.099, 310/216.106
See application file for complete search history.

(56) References Cited

U.S. PATENT DOCUMENTS

| | | | | |
|---|---|---|---|---|
| 5,095,238 A | * | 3/1992 | Suzuki ................... | H02K 29/08 310/156.46 |
| 5,170,083 A | * | 12/1992 | Burgbacher ........... | H02K 29/03 310/156.12 |
| 5,986,377 A | | 11/1999 | Yamada et al. | |

(Continued)

FOREIGN PATENT DOCUMENTS

| | | |
|---|---|---|
| CN | 2558153 Y | 6/2003 |
| CN | 102130521 B | 7/2011 |

(Continued)

*Primary Examiner* — Hanh N Nguyen
(74) *Attorney, Agent, or Firm* — Muncy, Geissler, Olds & Lowe, P.C.

(57) ABSTRACT

A single-phase outer-rotor motor and a stator thereof are provided. The stator includes a stator core having a yoke and a number of teeth. Each tooth includes a tooth body and a tooth tip. A winding slot is formed between each two adjacent tooth bodies. A slot opening is formed between each two adjacent tooth tips. The tooth tip protrudes beyond the tooth body. Inner surfaces of at least part of the tooth tips facing the stator are formed with cutting grooves such that a portion of the tooth tip outside the cutting groove is capable of being tilted outwardly to enlarge the slot opening and deformed inwardly to narrow the slot opening.

20 Claims, 32 Drawing Sheets

(51) Int. Cl.
*H02K 1/27* (2006.01)
*H02K 3/18* (2006.01)

(56) References Cited

U.S. PATENT DOCUMENTS

| | | |
|---|---|---|
| 6,242,835 B1 | 6/2001 | Uemura et al. |
| 6,376,963 B1 | 4/2002 | Furuya et al. |
| 6,568,066 B2 | 5/2003 | Furuya et al. |
| 6,742,238 B2 * | 6/2004 | Lee .................... H02K 15/0018 29/596 |
| 8,354,769 B2 | 1/2013 | Naganawa et al. |
| 2002/0067092 A1 | 6/2002 | Crapo et al. |
| 2011/0175485 A1 | 7/2011 | Naganawa et al. |
| 2014/0146415 A1 | 5/2014 | Kim et al. |
| 2014/0217847 A1 * | 8/2014 | Kwan .................... H02K 29/03 310/156.38 |

FOREIGN PATENT DOCUMENTS

| | | |
|---|---|---|
| EP | 1 763 919 B1 | 8/2012 |
| JP | 52-009805 | 1/1977 |
| JP | 55-079660 | 6/1980 |
| JP | H10304609 A | 11/1998 |
| JP | 2001-136701 | 5/2001 |
| JP | 2002-101581 | 4/2002 |
| JP | 3452759 | 9/2003 |
| JP | 2010-273460 | 12/2010 |

\* cited by examiner

SINGLE-PHASE OUTER-ROTOR MOTOR AND STATOR THEREOF

CROSS REFERENCE TO RELATED APPLICATIONS

This non-provisional patent application claims priority under 35 U.S.C. § 119(a) from Patent Application No. 201510233218.6 filed in The People's Republic of China on May 8, 2015 and Patent Application No. 201510629630.X filed in The People's Republic of China on Sep. 28, 2015.

FIELD OF THE INVENTION

The present invention relates to single-phase motors, and in particular, to a single-phase outer-rotor motor.

BACKGROUND OF THE INVENTION

Single-phase motors are commonly used in home appliances with small startup load, such as, clothes washing machines, dish washers, refrigerators, air conditioners or the like. In terms of the relative positions of the stator and the rotor, the single-phase motors are categorized into inner-rotor motors and outer-rotor motors. As the name suggests, in a single-phase outer-rotor motor, the stator is disposed in an interior, the rotor surrounds the stator, and a load can be directly embedded in the rotor. For the single-phase outer-rotor motor, because the stator is disposed inside the rotor, the size of the stator is limited. For facilitating the winding, teeth of the stator define therebetween slot openings with large width, such that the motor has a large cogging torque, which affects the rotor stability during rotation and produces noises.

SUMMARY OF THE INVENTION

Thus, there is a desire for an outer-rotor motor and a stator thereof which can effectively reduce the cogging torque.

In one aspect, a stator for a single-phase outer-rotor motor is provided which includes a stator core. The stator core includes a yoke and a plurality of teeth extending radially outwardly from an outer edge of the yoke. Each tooth includes a tooth body connected with the yoke and a tooth tip formed at a distal end of the tooth body. A winding slot is formed between each two adjacent tooth bodies. A slot opening is formed between each two adjacent tooth tips. The tooth tip has a width in a circumferential direction greater than that of the tooth body, thus protruding beyond the tooth body in the circumferential direction. Inner surfaces of at least part of the tooth tips facing the stator are formed with cutting grooves such that a portion of the tooth tip outside the cutting groove is capable of being tilted outwardly to enlarge the slot opening and deformed inwardly to narrow the slot opening.

Preferably, the portion of the tooth tip outside the cutting groove has a deformation angle of 15° to 60°. More preferably, the portion of the tooth tip outside the cutting groove has a deformation angle of 20° to 45°.

Preferably, the cutting groove is formed in a connecting area between the tooth tip and the tooth body.

Preferably, the cutting groove is located adjacent the tooth body and spaced from the tooth body.

Preferably, each of the tooth tips is formed with the cutting groove.

Preferably, there is only one cutting groove formed on the tooth tip, and a single side of the tooth tip is tilted outwardly before the tooth tip is forced to bend to form the stator core.

Preferably, the tooth tips of a half of the plurality of the teeth are formed with the cutting grooves, the tooth tips of the other half of the plurality of the teeth are not formed with the cutting grooves, and the tooth tips with the cutting grooves and the tooth tips without the cutting grooves are spacingly and alternatively arranged in the circumferential direction.

Preferably, the number of the cutting grooves on the tooth tip is two, the two cutting grooves are located at opposite sides of the tooth body, and both sides of the tooth tip are tilted outwardly before the tooth tip is forced to bend inwardly to form the stator core.

Preferably, the stator further comprises windings wound around the stator core, and the portion of the tooth tip outside the cutting groove is tilted outwardly before the windings are wound around the stator core. After the windings are wound around the stator core, the tilted portion of the tooth tip deforms to bend inwardly to form the stator core.

In another aspect, a stator for a single-phase outer-rotor motor is provided which includes a stator core and windings wound around the stator core. The stator core includes a yoke and a plurality of teeth extending radially outwardly from an outer edge of the yoke. Each of the teeth includes a tooth body connected with the yoke and a tooth tip formed at a distal end of the tooth body. The windings are wound around the tooth bodys. The tooth tip has a width greater than that of the tooth body. Two circumferential sides of the tooth tip extend beyond the tooth body to respectively form two wing portions. A slot opening is formed between the opposed wing portions of each two adjacent tooth tips. At least one of two wing portions adjacent each slot opening is tilted outwardly before the windings are wound, and the tilted wing portion deforms to bend inwardly to form the stator core after the windings are wound.

Preferably, the wing portions of each of the tooth tips of a half of the plurality of the teeth are both tilted outwardly, neither of the wing portions of the tooth tips of the other half of the plurality of the teeth are tilted outwardly, and the tooth tips with the tilted wing portions and the tooth tips without the tilted wing portions are spacingly and alternatively arranged in the circumferential direction. Preferably, one of the wing portions of each tooth tip is tilted outwardly, the other of the wing portions of each tooth tip is not tilted outwardly, and all the tilted wing portions are located at the same side of the tooth bodies.

Preferably, the tilted wing portion is formed with a cutting groove and, after the windings are wound, the tilted wing portion deforms to bend inwardly to reduce or eliminate the cutting groove.

In still another aspect, a single-phase outer-rotor motor is provided which includes the stator as described above and a rotor surrounding the stator. At least one permanent magnet is disposed inside the housing to form a plurality of magnetic poles, inner surfaces of the magnetic poles are opposed to and radially spaced from outer surfaces of the tooth tips to thereby form therebetween a gap. The width of the slot opening in the circumferential direction is less than or equal to five times of a minimum width of the gap.

Preferably, the width of the slot opening in the circumferential direction is less than or equal to three times of the minimum width of the gap.

Preferably, a ratio of a maximum width to the minimum width of the gap is greater than two.

Preferably, there are a plurality of the permanent magnets spacingly and evenly arranged in the circumferential direction, and each of the permanent magnets has a pole-arc coefficient greater than 0.7.

In comparison with the conventional outer-rotor motor, the tooth tip of the stator of the motor of the present invention is tilted outwardly prior to the forming of the stator core, which enlarges the spacing between the tooth tips thus facilitating the winding. After the winding is completed, the tooth tip deforms to bend inwardly, such that the adjacent tooth tips form therebetween a narrow slot opening which can effectively reduce the cogging torque. Therefore, the motor can operate smoothly with low noise.

DETAILED DESCRIPTION OF THE PREFERRED EMBODIMENTS

Figure 1:
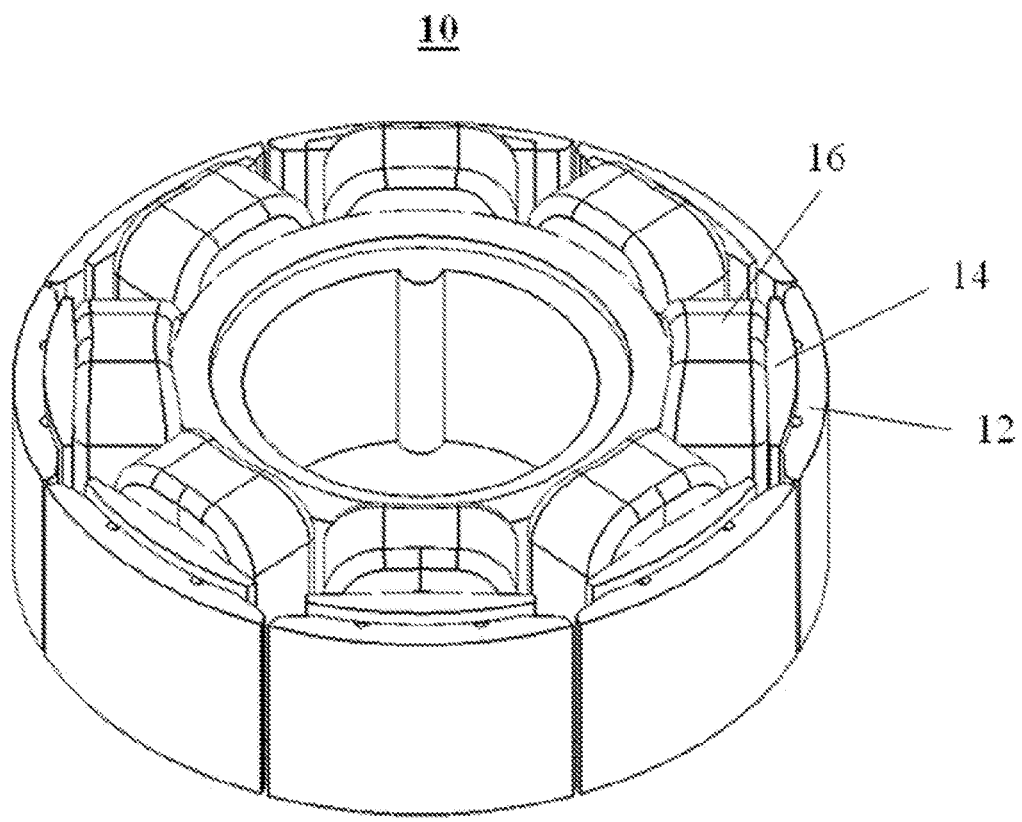
FIG. 1 illustrates a stator of an outer-rotor motor according to one embodiment of the present invention.
Figure 2:
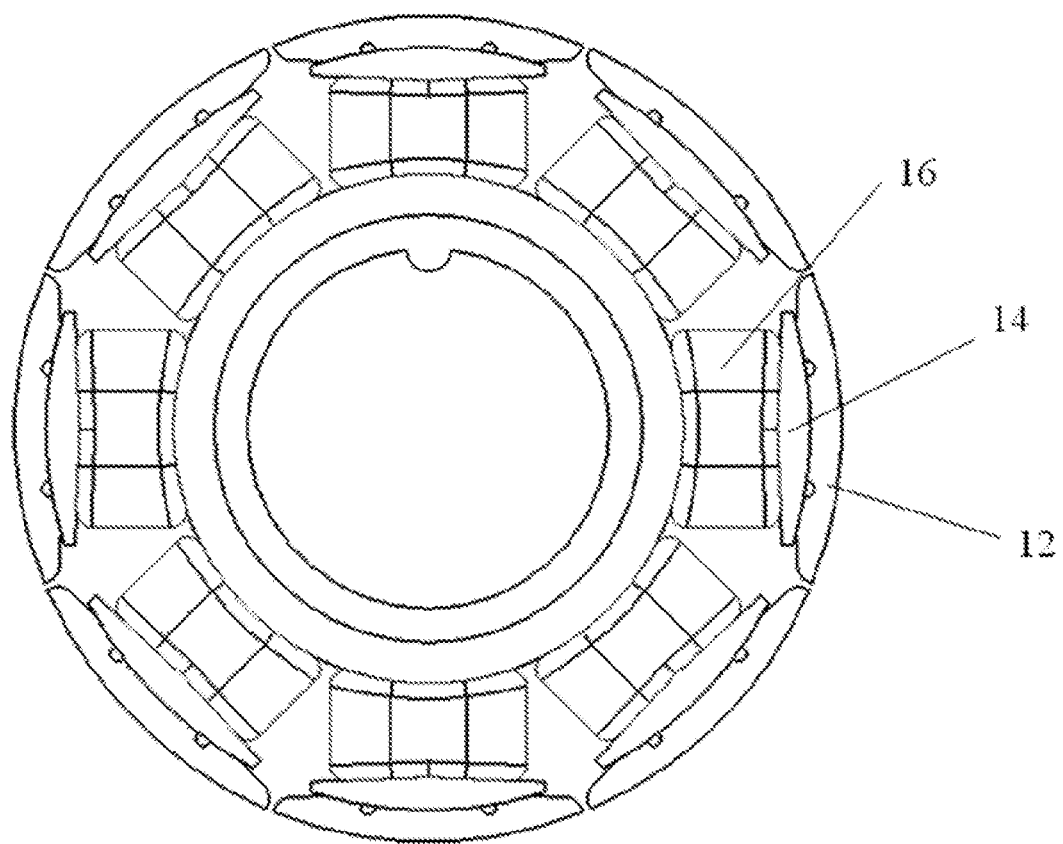
FIG. 2 is a top view of FIG. 1.
Figure 3:
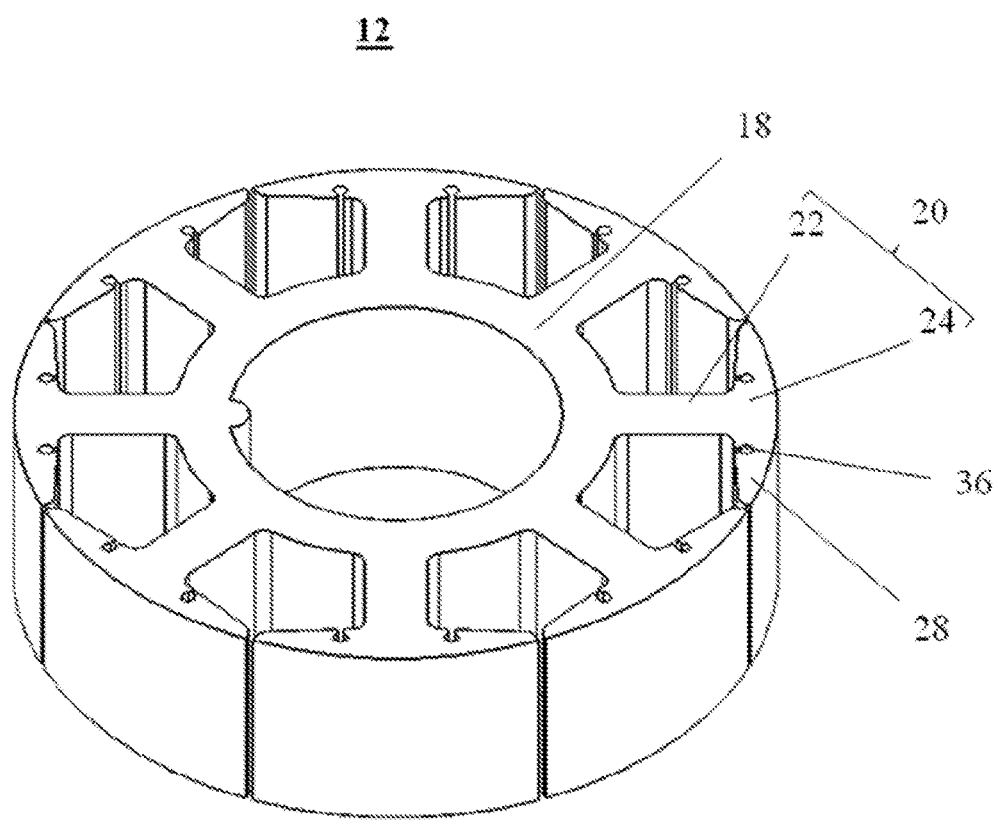
FIG. 3 illustrates a stator core of the stator of FIG. 1.
Figure 4:
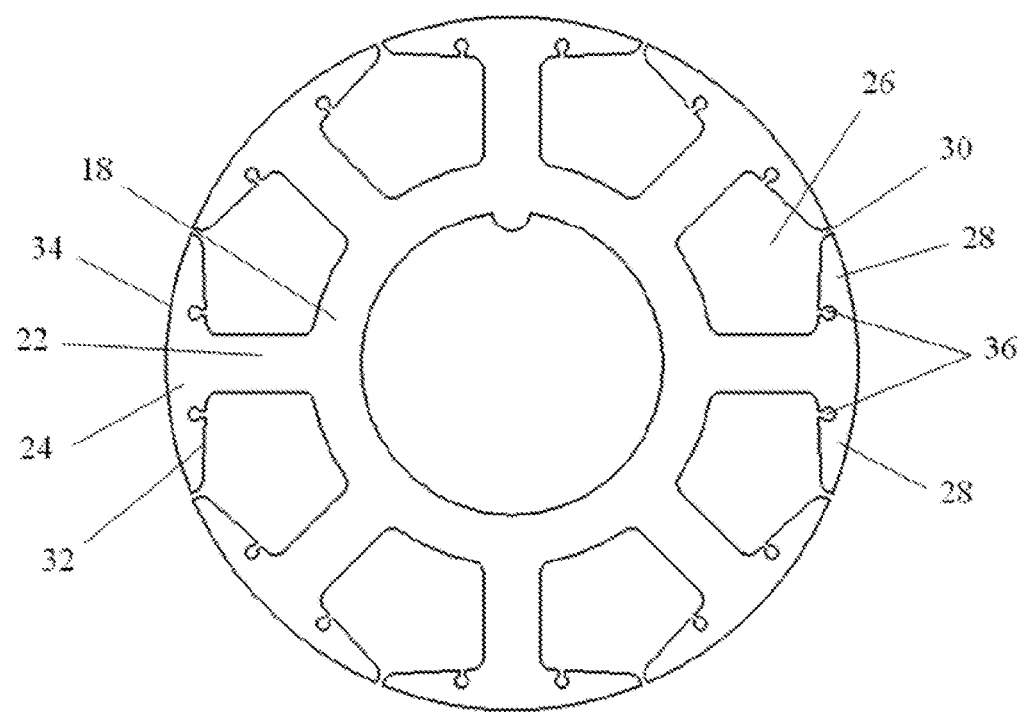
FIG. 4 is a top view of FIG. 3.

To further explain the technical solution and results of the present invention, preferred embodiments of the invention will now be described with reference to figures of the accompanying drawings.

The single-phase outer-rotor motor includes a stator and a rotor surrounding the stator. The stator and rotor can have various different structures, and different stators and rotors can be combined to result in motors with different characteristics. FIG. 1 through FIG. 16 illustrate multiple embodiments of the stator, FIG. 17 through FIG. 21 illustrate multiple embodiments of the rotor, and FIG. 22 through FIG. 28 exemplarily illustrate several motors formed by the above stators and rotors. It should be understood that the figures are for the purposes of reference and illustration only. The stator and rotor of the present invention are not intended to be limited to the embodiments as shown in the drawings, and the motors formed by the stators and rotors are also not intended to be limited to the embodiments as shown.

FIG. 1 through FIG. 4 illustrate a stator 10 according to a first embodiment. In this embodiment, the stator 10 includes a stator core 12, an insulating bracket 14 wrapping around the stator core 12, and windings 16 wound around the insulating bracket 14.

The stator core 12 is made by stacking magnetic-conductive materials such as silicon steel sheets. The stator core 12 includes an annular yoke 18, and a plurality of teeth 20 extending integrally and radially outwardly from an outer edge of the yoke 18. The teeth 20 are evenly disposed along a circumferential direction of the yoke 18. Each tooth 20 includes a tooth body 22 connected with the yoke 18 and a tooth tip 24 formed at a distal end of the tooth body 22. The tooth body 22 extends along a straight line. Preferably, the tooth body 22 extends along a radial direction of the annular yoke 18 A winding slot 26 is formed between each two adjacent tooth bodies 22. The winding slot 26 is generally sector-shaped, having a width gradually increasing in a radially outward direction from the yoke 18. The tooth tip 24 is overall arc-shaped, which extends generally along a circumferential direction thereof and is generally symmetrical with respect to the tooth body 22. Preferably, each tooth tip 24 is symmetrical with respect to a radius of the motor that passes through a center of the tooth body 22 of the tooth 20. In the circumferential direction, the tooth tip 24 has a width greater than the width of the tooth body 22, and two circumferential sides of the tooth tip 24 extend beyond the tooth body 22 to respectively form two wing portions 28. In this embodiment, narrow slot openings 30 are formed between the wing portions 28 of adjacent tooth tips 24.

Each tooth tip 24 includes an inner surface 32 facing the tooth body 22, and an outer surface 34 facing the rotor 50. Preferably, the outer surface 34 is an arc surface. The outer surfaces 34 of the tooth tips 24 function as an outer surface of the stator 10 and are generally located at the same cylindrical surface that is coaxial with the yoke 18 of the stator 10. Cutting grooves 36 are formed in the inner surface 32 of the tooth tip 24. In this embodiment, there are two cutting grooves 36 that are disposed symmetrically in the two wing portions 28, close to and spaced from the tooth body 22. Each cutting groove 36 extends along a radial direction, i.e. a thickness direction of the tooth tip 24, into the inner surface 32 of the tooth tip 24. The cutting groove 36 has a depth that is generally a half of the thickness of the tooth tip 24 at the cutting groove 36, such that the cutting groove 36 does not cause a great affect to the magnetic path.

Figure 5:
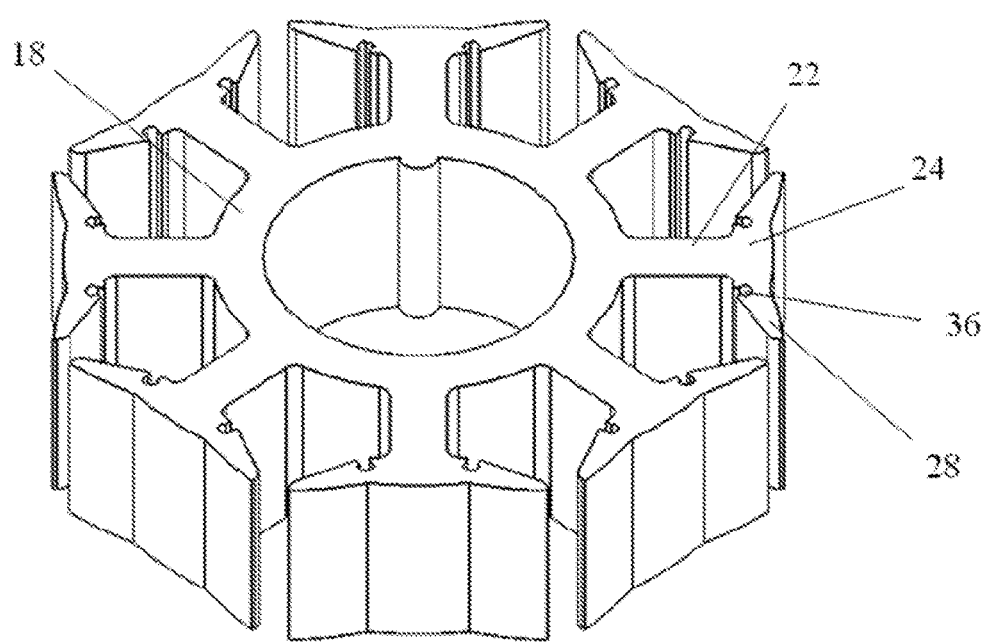
FIG. 5 illustrates the stator core of FIG. 3 prior to the forming thereof.
Figure 6:
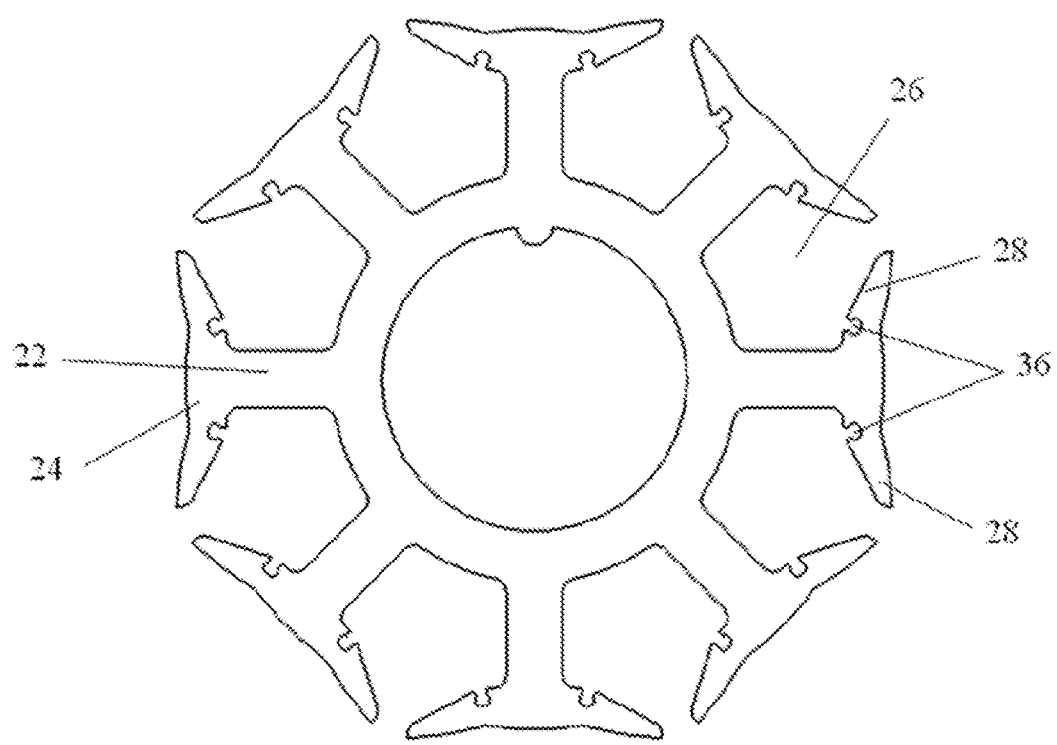
FIG. 6 is a top view of FIG. 5.

The winding 16 is wound around the tooth body 22 and located at an inner side of the tooth tip 24. The winding 16, tooth body 22 and the inner surface 32 of the tooth tip 24 are separated apart by the insulating bracket 14. The insulating bracket 14 is usually made from a plastic material to avoid short-circuit of the winding 16. As shown in FIG. 5 and FIG. 6, prior to winding the windings around the stator core 12, a portion of the tooth tip 24 outside the cutting groove 36 is tilted outwardly to enlarge a distance between adjacent tooth tips 24, such that the windings 16 can be conveniently wound around the tooth bodies 22. After winding is completed, the outer surface 34 of the tooth tip 24 is pushed inwardly, making the tooth tip 24 deform to bend toward the tooth body 22, thus forming the arc outer surface 34. During this process, the distance between the tooth tips 24 decreases to narrow the slot opening 30, such that the narrow slot opening 30 is formed, and the cutting groove 36 is narrowed, or even becomes slit-shaped. Preferably, an angle between the portion of the tooth tip 24 outside the cutting groove 36 prior to the deformation and the portion after the deformation, i.e. a deformation angle, is in the range of 15° to 60°. More preferably, the deformation angle of the portion of the tooth tip 24 outside the cutting groove 36 is in the range of 20° to 45°.

For stators having the same size, the tooth tip 24 of the stator core 12 of the stator 10 is tilted outwardly prior to winding of the windings, which facilitates the winding of the windings. After the winding process is completed, the tooth tip 24 is deformed to bend inwardly. In comparison with the conventional stator core structure formed by stacking silicon steel sheets that are formed by one-step punching, the tooth tip 24 has a greater width in the circumferential direction, and the width of the slot opening 30 between the tooth tips 24 is significantly reduced, preferably, to a half of the width of the slot opening 30 of the conventional stator core structure or even less, which effectively reduces the cogging torque. It should be understood that the cutting groove 36 is formed to facilitate the inward bending deformation of the tooth tip 24 and, in some embodiments, the cutting groove 36 can be omitted if the material of the tooth tip 24 itself has a certain degree of deformation capability.

Figure 7:
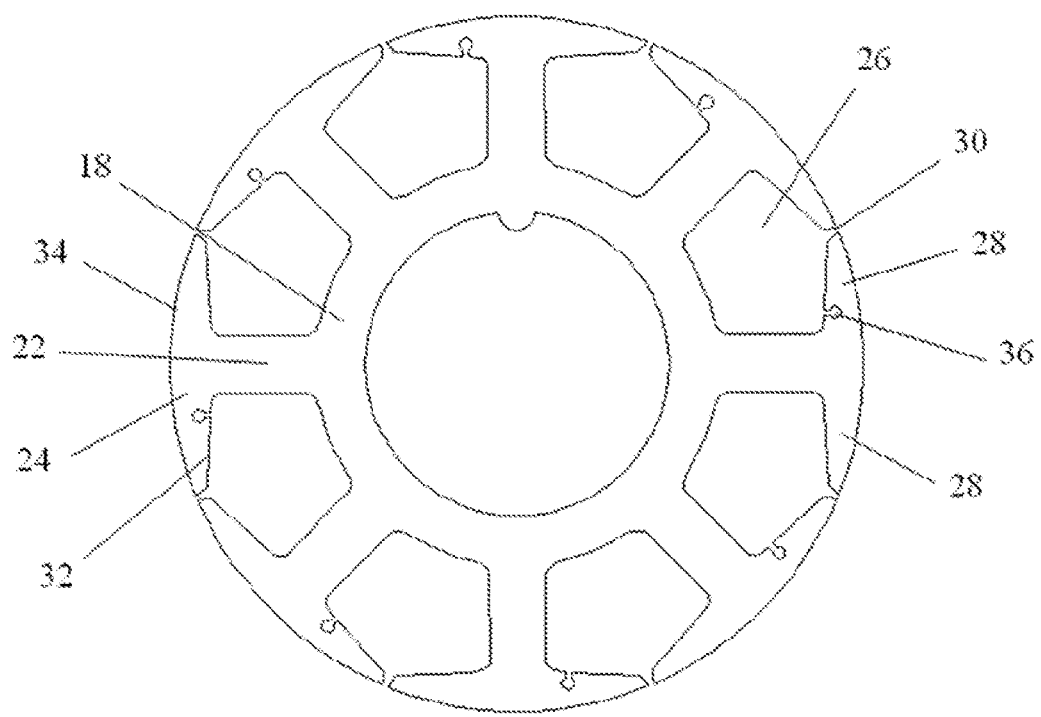
FIG. 7 illustrates a stator core of the stator according to a second embodiment.
Figure 8:
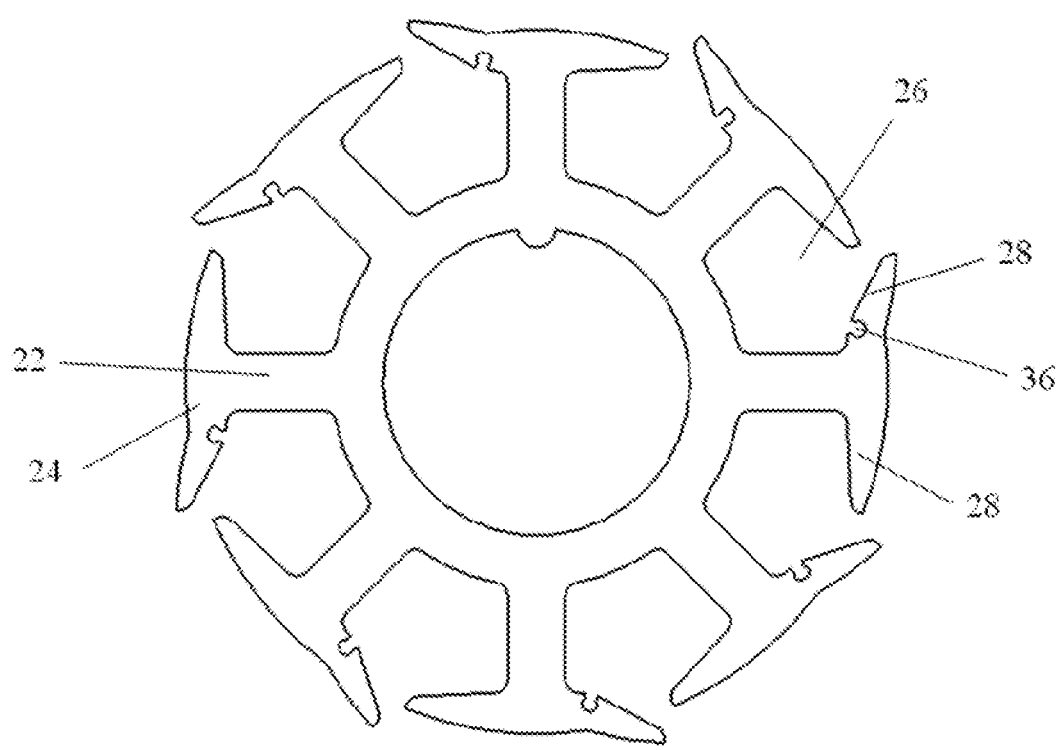
FIG. 8 illustrates the stator core of FIG. 7 prior to the forming thereof.

FIG. 7 illustrates a stator core 12 of the stator 10 according to a second embodiment, which is different from the above stator core in that, each tooth tip 24 of the present embodiment forms the cutting groove 36 at only/single one of the wing portions 28. Taking the orientation shown in the figures as an example, each cutting groove 36 is formed in the wing portion 28 on the counterclockwise side of the corresponding tooth body 22. As shown in FIG. 8, prior to the forming of the stator core 12, only the wing portion 28 of the tooth tip 24 on the counterclockwise side of the tooth body 22 is tilted outwardly. Because all the wing portions 28 on the same side of the tooth tips 24 are tilted outwardly, each tilted wing portion 28 and the wing portion 28 of an adjacent tooth tip 24 that is not tilted offset from each other in the circumferential direction, such that the adjacent wing portions 28 can still form a greater distance therebetween for facilitating the winding. After the winding process is completed, the titled wing portions 28 are bent inwardly which reduces the distance between the adjacent wing portions 28 to form the narrow slot openings 30, thus reducing the cogging torque.

Figure 9:
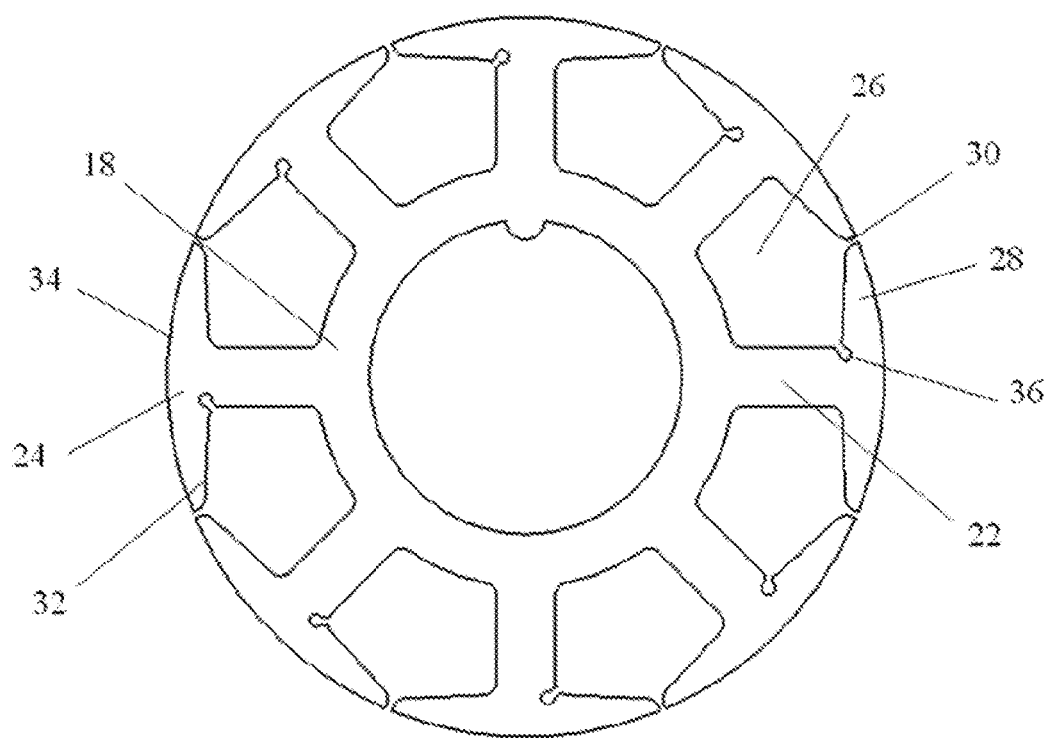
FIG. 9 illustrates a stator core of the stator according to a third embodiment.
Figure 10:
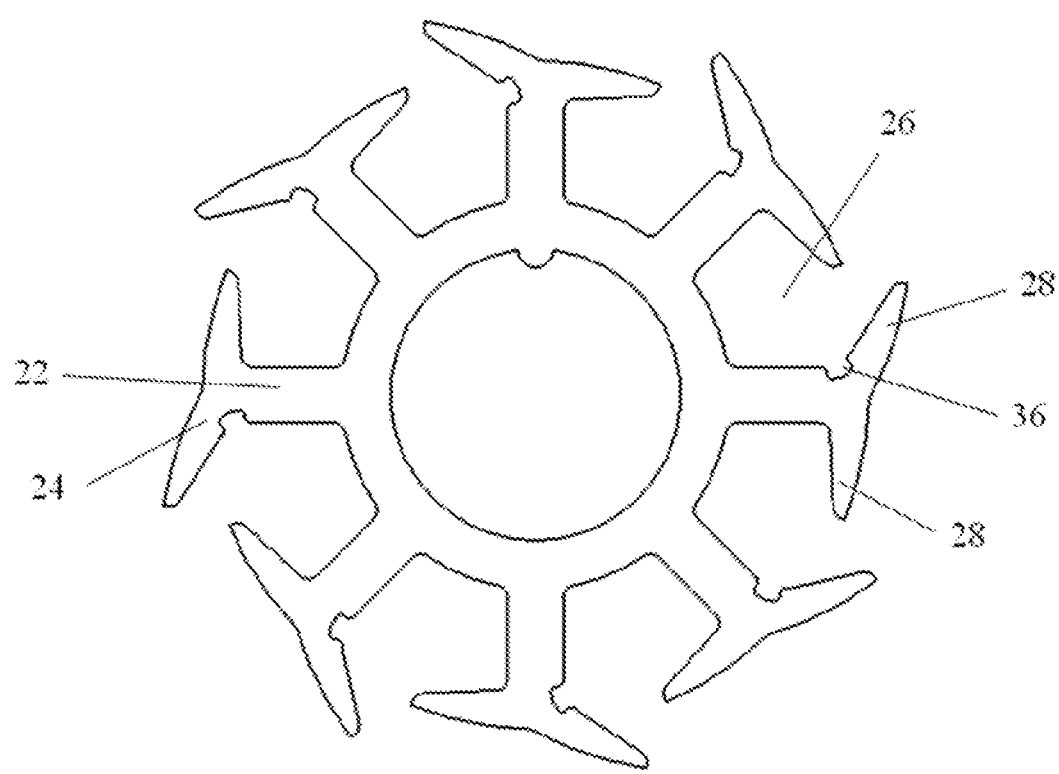
FIG. 10 illustrates the stator core of FIG. 9 prior to the forming thereof.

FIG. 9 illustrates a stator core 12 of the stator 10 according to a third embodiment. In comparison with the previous embodiment, the stator core 12 of the third embodiment is different in that, the cutting groove 36 is formed at the connecting area of the wing portion 28 and the tooth body 22, and only one of the two wing portions 28 is tilted outwardly prior to the winding, as shown in FIG. 10. As such, the cutting groove 36 can have a greater depth, the tooth tip 24 can have a greater tilting angle, and the tooth tips 24 can have a greater distance therebetween prior to the forming of the stator core, such that the winding can be more conveniently performed. In addition, it should be understood that the connecting areas of both winding portions 28 and the tooth body 22 can form the cutting grooves 36, and both wing portions 28 are tilted outwardly prior to the winding.

Figure 11:
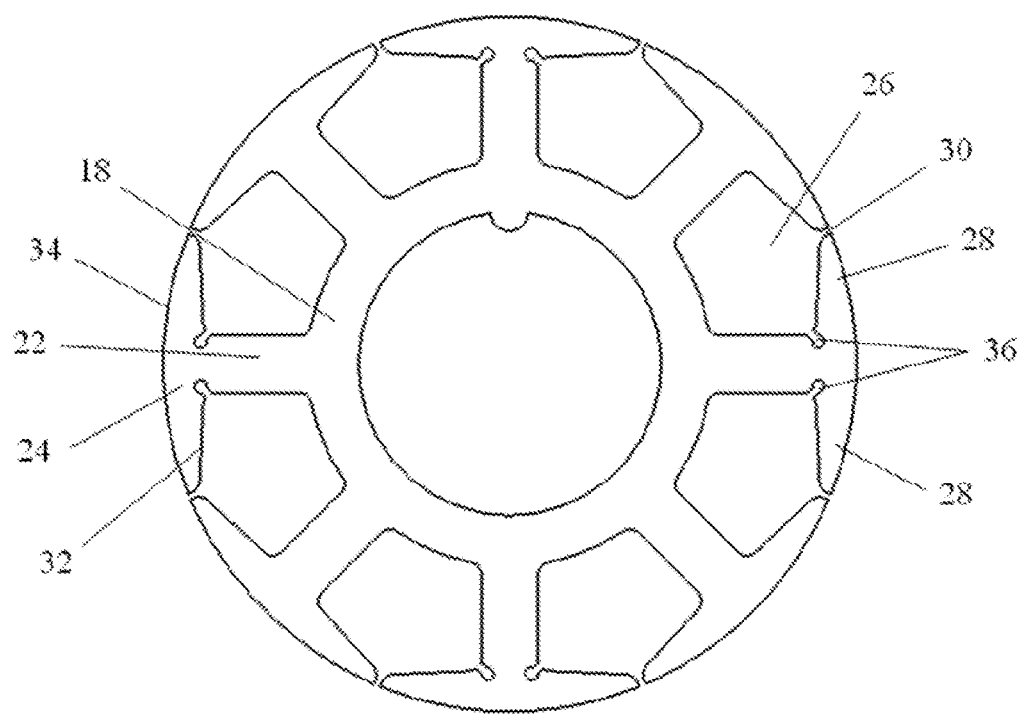
FIG. 11 illustrates a stator core of the stator according to a fourth embodiment.
Figure 12:
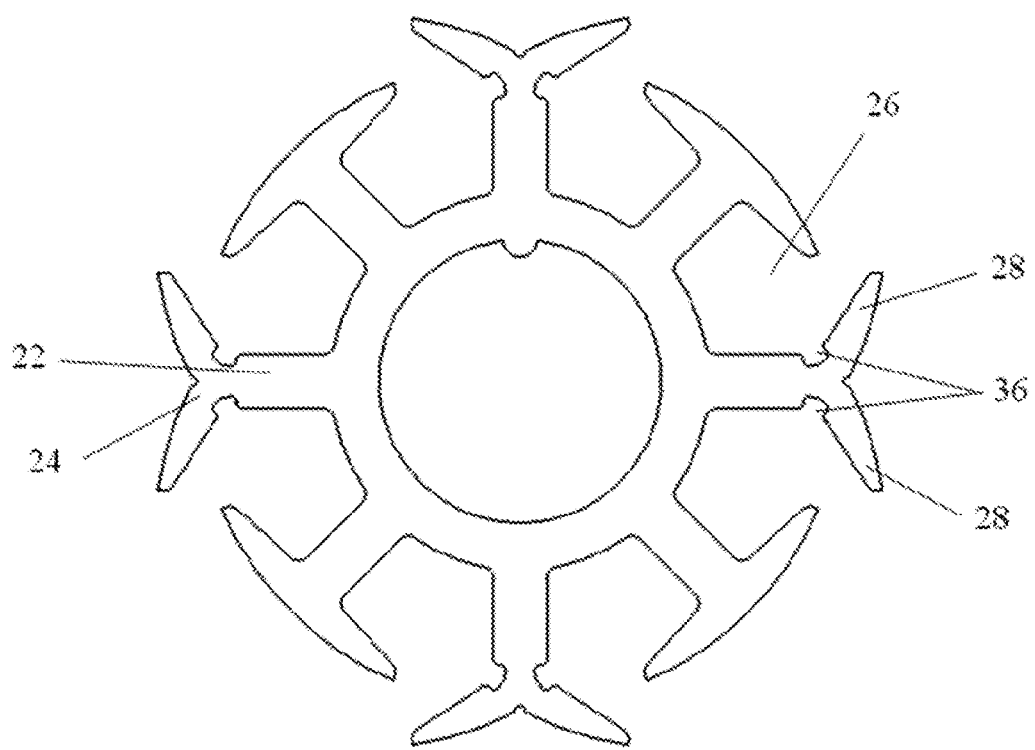
FIG. 12 illustrates the stator core of FIG. 11 prior to the forming thereof.
Figure 13:
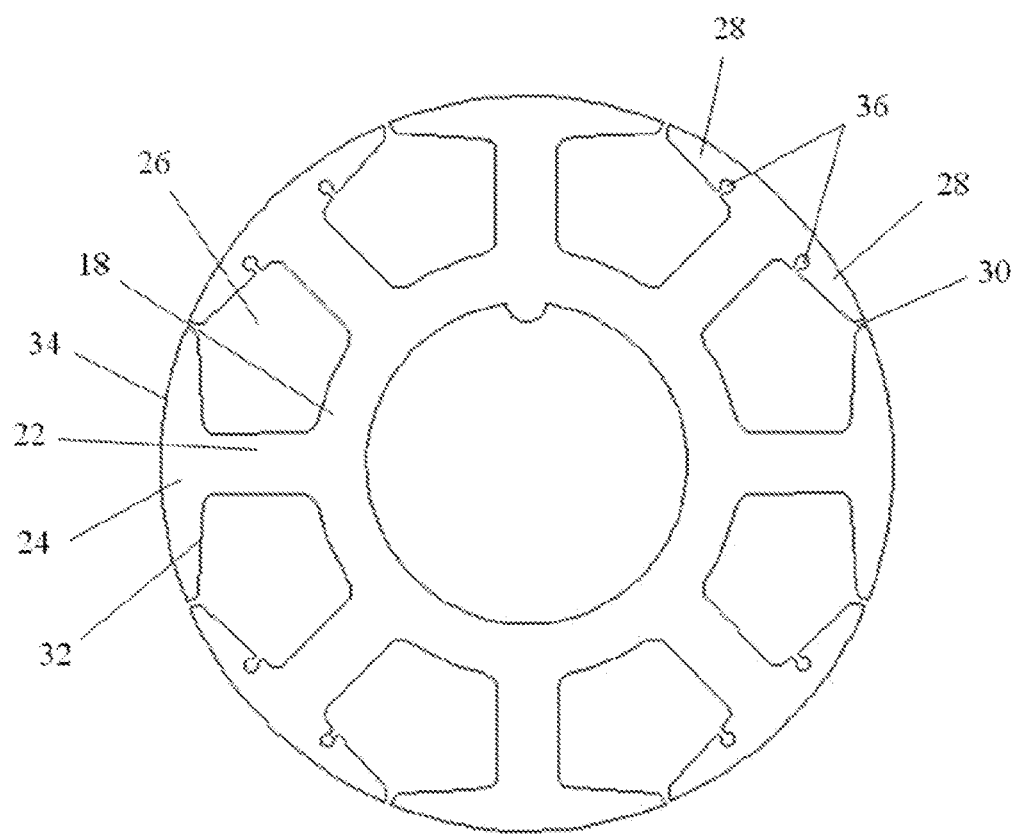
FIG. 13 illustrates a stator core of the stator according to a fifth embodiment.
Figure 14:
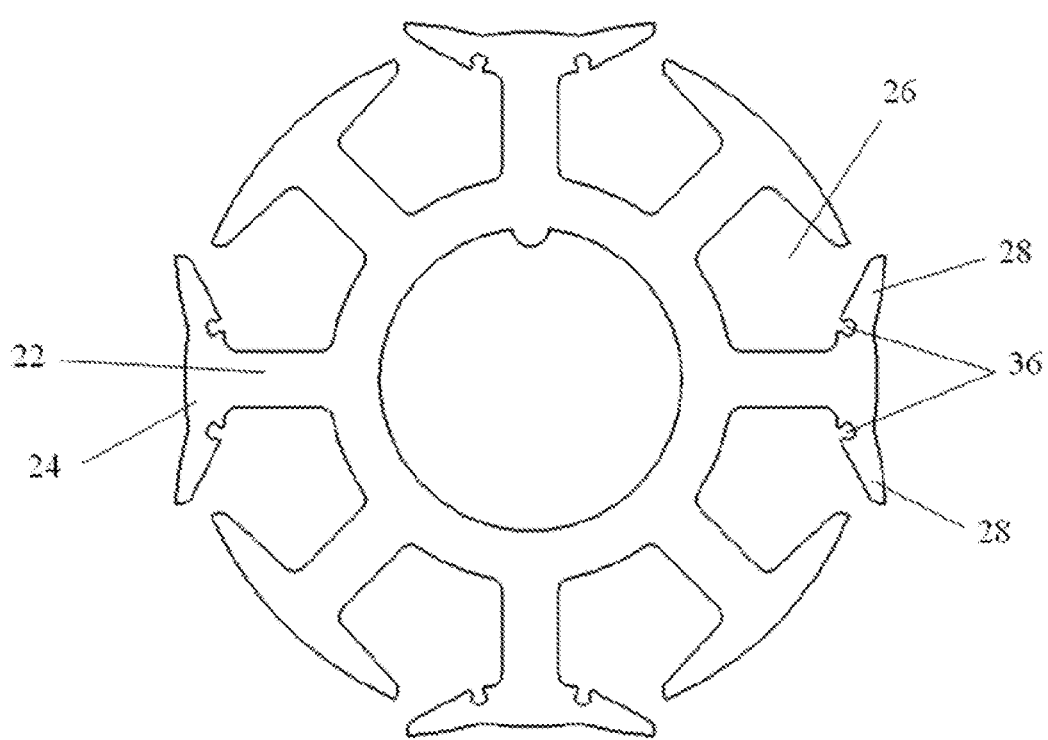
FIG. 14 illustrates the stator core of FIG. 13 prior to the forming thereof.

FIG. 11 through FIG. 14 illustrate the stator core 12 of the stator 10 according to another two embodiments, which are different in that, some tooth tips 24 form the cutting grooves 36, while some others do not form the cutting grooves 36. The tooth tips 24 with cutting grooves are alternatively arranged with the tooth tips 24 without the cutting grooves. Preferably, the cutting grooves 36 of the tooth tip 24 with the cutting grooves 36 are formed in the two wing portions 28, respectively. Prior to the forming of the stator core, both winging portions 28 are tilted outwardly, which form greater distances with adjacent tooth tips without the cutting grooves 36, respectively, to facilitate the winding. The cutting grooves 36 may be respectively formed at the connecting areas of the wing portions 28 and the tooth body 22, as shown in FIG. 11 and FIG. 12. Alternatively, the cutting grooves 36 may also be formed at middles of the wing portions 28 and spaced from the tooth body 22, as shown in FIG. 13 and FIG. 14.

In the above embodiment, the wing portion 28 of the tooth tip 24 of the stator core 12 is tilted outwardly prior to the winding and deforms to bend inward after the winding. As such, the winding of the windings 16 is facilitated, and after the final forming of the stator core, the tooth tip can have a greater width in the circumferential direction to form the smaller slot opening 30, thus reducing the cogging torque. In fact, as long as one of the wing portions 28 at opposite sides of each slot opening 30 is tilted outwardly, only one or both of the two wings of each tooth tip 24 of the same stator core 12 can be tilted outwardly, or both of the two wings are not tilted outwardly. The above objective can be achieved by combining the wings tilted and the windings not tilted in various suitable patterns not limited to the embodiments as shown in the drawings. In the various embodiments illustrated above, the tooth tips 24 of the stator core 12 are discontinuous along the circumferential direction, which form therebetween narrow slot openings 30. In some other embodiments, the tooth tips 24 may be connected with one another along the circumferential direction, thus minimizing the cogging torque.

Figure 15:
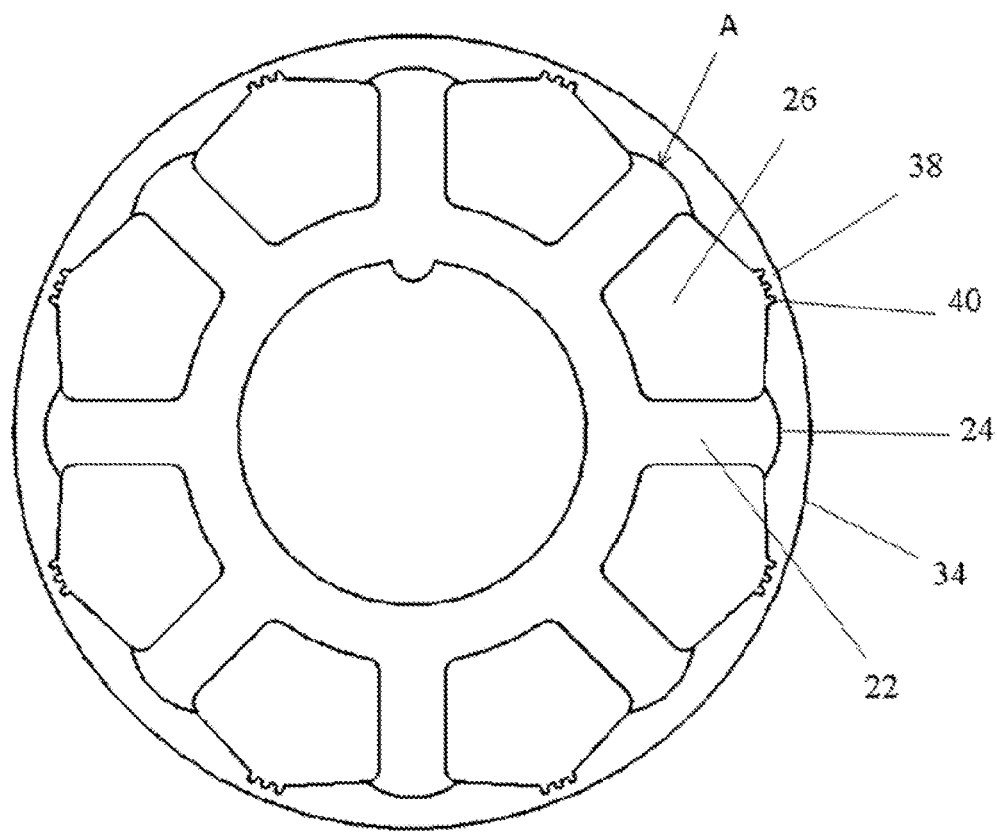
FIG. 15 illustrates a stator core of the stator according to a sixth embodiment.
Figure 16:
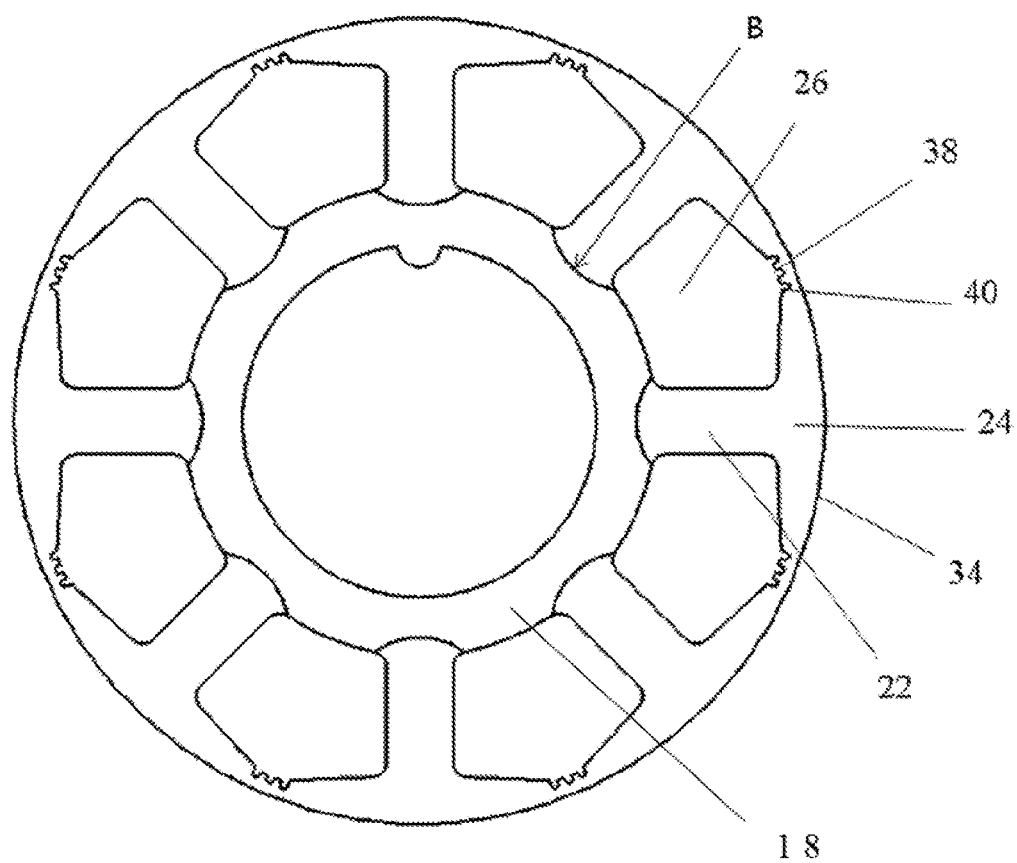
FIG. 16 illustrates a stator core of the stator according to a seventh embodiment.

FIG. 15 and FIG. 16 illustrate the stator core 12 of the stator 10 according to another two embodiments. In these two embodiments, magnetic bridges 38 are formed between adjacent tooth tips 24. The magnetic bridges 38 integrally connect the tooth tips 24 to collectively form a closed annular edge. Preferably, the closed annular edge has a minimum radial thickness at a position of the magnetic bridge 38. More preferably, one or more axially extending grooves 40 are formed in an inner surface of the magnetic bridge 38. As shown, each magnetic bridge 38 forms a plurality of the grooves 40 evenly arranged along the circumferential direction. In order for the winding to be performed, the tooth tip may be separated apart from the tooth body 22 at a connection area therebetween (as shown in FIG. 15). As such, after the winding process is completed, the annular edge collectively formed by the tooth tips 24 is again connected around the tooth bodies 22 along an axial direction to form the stator core 12. In the embodiment illustrated in FIG. 16, the tooth bodies 22 are separated apart from the yoke 18 at connection areas therebetween and, after the winding is processed, the yoke 18 is assembled within the tooth bodies 22 to form the stator core 12.

Figure 17:
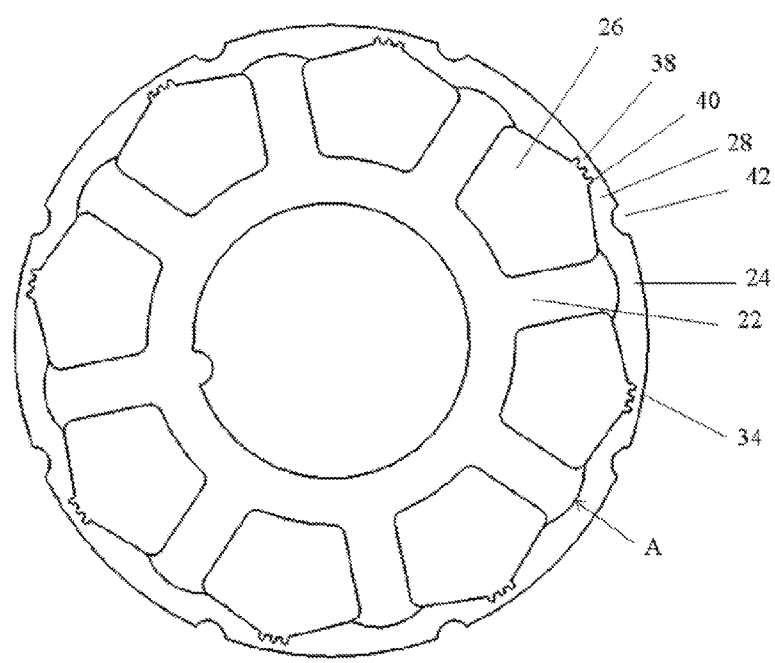
FIG. 17 illustrates a stator core of the stator according to an eighth embodiment.
Figure 18:
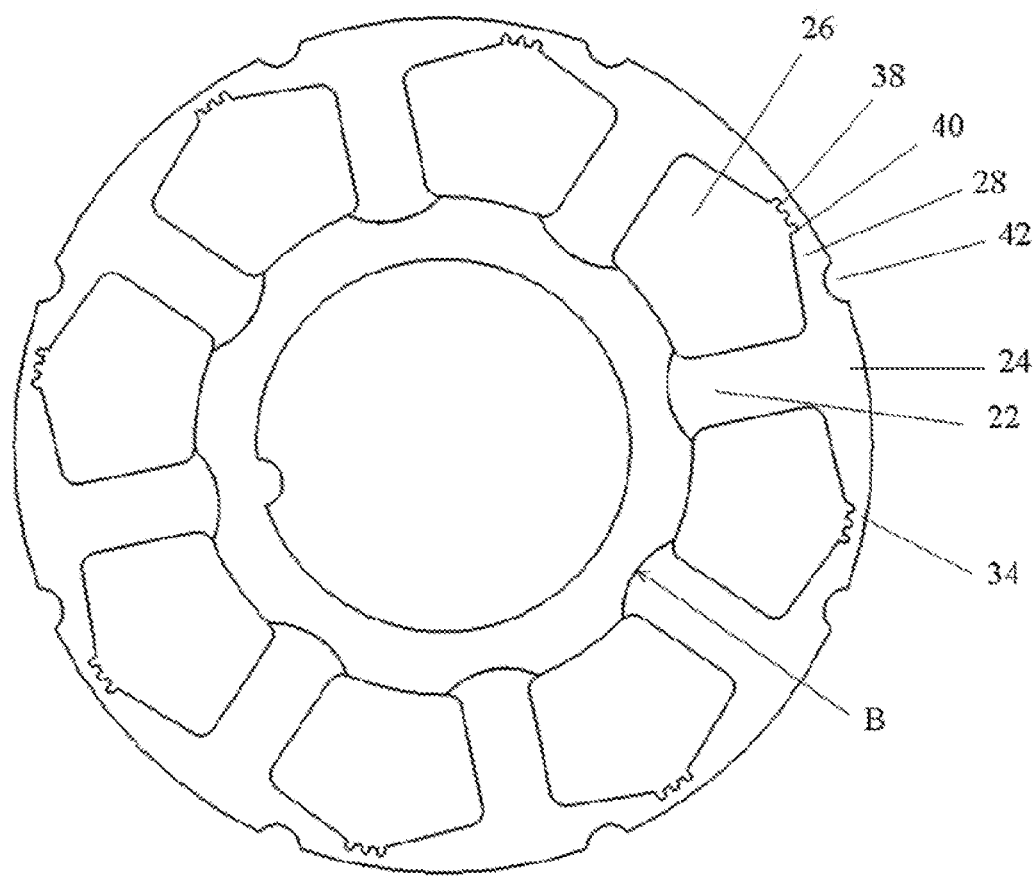
FIG. 18 illustrates a stator core of the stator according to a ninth embodiment.

FIG. 17 and FIG. 18 illustrate the stator core 12 according to another two embodiments. The constructions of the stator core 12 of these two embodiments are generally the same as the embodiments of FIG. 15 and FIG. 16, respectively, except that, an outer circumferential surface 34 of the tooth tip 24 is provided with a positioning groove 42 which is disposed in the wing portion 28 and deviates from a center of the tooth tip 24, such that the tooth tip 24 is asymmetrical with respect to a radius of the motor that passes through a center of the tooth body 22 of the tooth 20.

FIG. 19 through FIG. 23 illustrate the rotor 50 according to various embodiments of the present invention. The rotor 50 is an outer rotor, including a housing 52 and one or multiple permanent magnets 54 affixed to an inside of the housing 52. An outer wall surface of the permanent magnet 54 is affixed to the housing 52, which may be positioned with adhesive or integrally connected by insert molding. An inner surface 56 of the permanent magnet 54 defines a space for mounting the stator 10 therein. The space is slightly greater than the stator 10 in size, such that the stator 10 and the rotor 50 define a gap therebetween.

Figure 19:
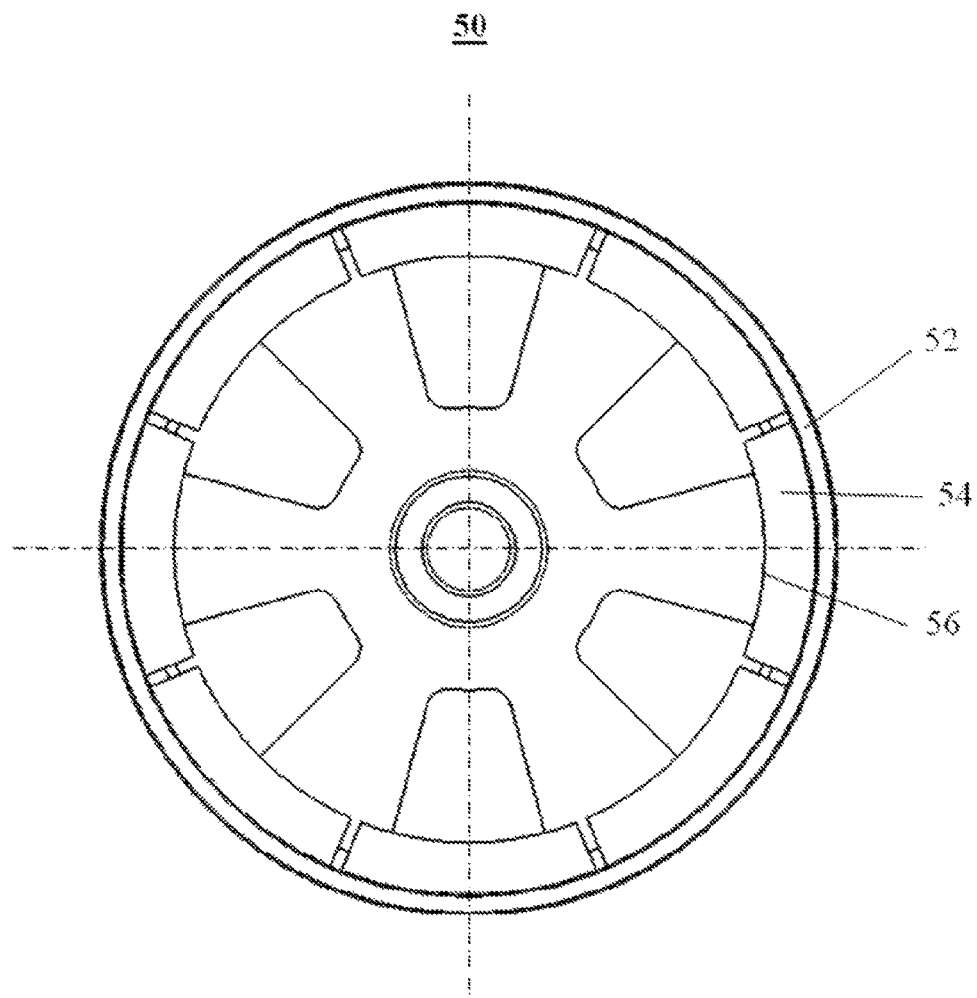
FIG. 19 illustrates a rotor of an outer-rotor motor according to one embodiment of the present invention.

FIG. 19 illustrates the rotor 50 according to a first embodiment. In this embodiment, the permanent magnet 54 includes multiple split magnets arranged evenly along the circumferential direction of the housing 52, and a gap is formed between each two adjacent permanent magnets 54. Each permanent magnet 54 functions as one permanent magnetic pole of the rotor 50, and adjacent permanent magnets 54 have opposite polarities. In this embodiment, each permanent magnet 54 is a part of a circular ring, and the inner face 56 of the permanent magnet 54 facing the stator 10 is an arc surface. The inner surfaces 56 of all the permanent magnets 54 form the inner surface of the rotor 50, which are located on the same cylindrical surface coaxial with the rotor 50. If any one of the stators described above is mounted in the rotor 50, a radial distance between the outer surface of the tooth tip 24 of the stator 10 and the inner surface 56 of the permanent magnet 54 of the rotor 50 is constant along the circumferential direction and, therefore, the stator and rotor 10, 50 define a substantially even gap therebetween.

Preferably, a pole-arc coefficient of each permanent magnet 54, i.e. a ratio of the spanning angle α of the permanent magnetic pole 54 to a quotient of 360 degrees by the rotor pole number N, i.e. α:360/N, is greater than 0.7, which can improve the torque characteristics of the motor and enhance the motor efficiency. In various embodiments of the stator 10 and rotor 50 of the motor, the number of the permanent magnets 54 is the same as the number of the teeth 20, i.e. the magnetic poles of the stator 10 and the rotor 50 are the same. As shown, there are eight permanent magnets 54 and eight teeth 20, the eight magnets 54 form eight magnetic poles of the rotor 50, and the eight teeth 20 define therebetween eight winding slots 26, thereby cooperatively forming an 8-pole 8-slot motor. In other embodiments, the number of the teeth 20 of the stator 10 may have a multiple relation with the number of the permanent magnets 54 of the rotor 50. For example, the number of the teeth 20 is two or three times of the number of the permanent magnetic poles 54. Preferably, the windings 16 of the stator 10 are electrically connected and supplied with a single-phase direct current electricity by a single-phase brushless direct current motor driver, thus forming a single-phase direct current brushless motor. In another embodiment, the design of the present invention may be equally applicable as a single-phase permanent magnet synchronous motor.

FIG. 20 through FIG. 23 illustrate the rotor 50 according to several other embodiments. In these embodiments, the inner wall surface 56 of the magnet 54 is not a cylindrical arc surface and, after the stator 10 is mounted, the stator 10 and rotor 50 define therebetween an uneven gap. These embodiments are described in detail below.

Figure 20:
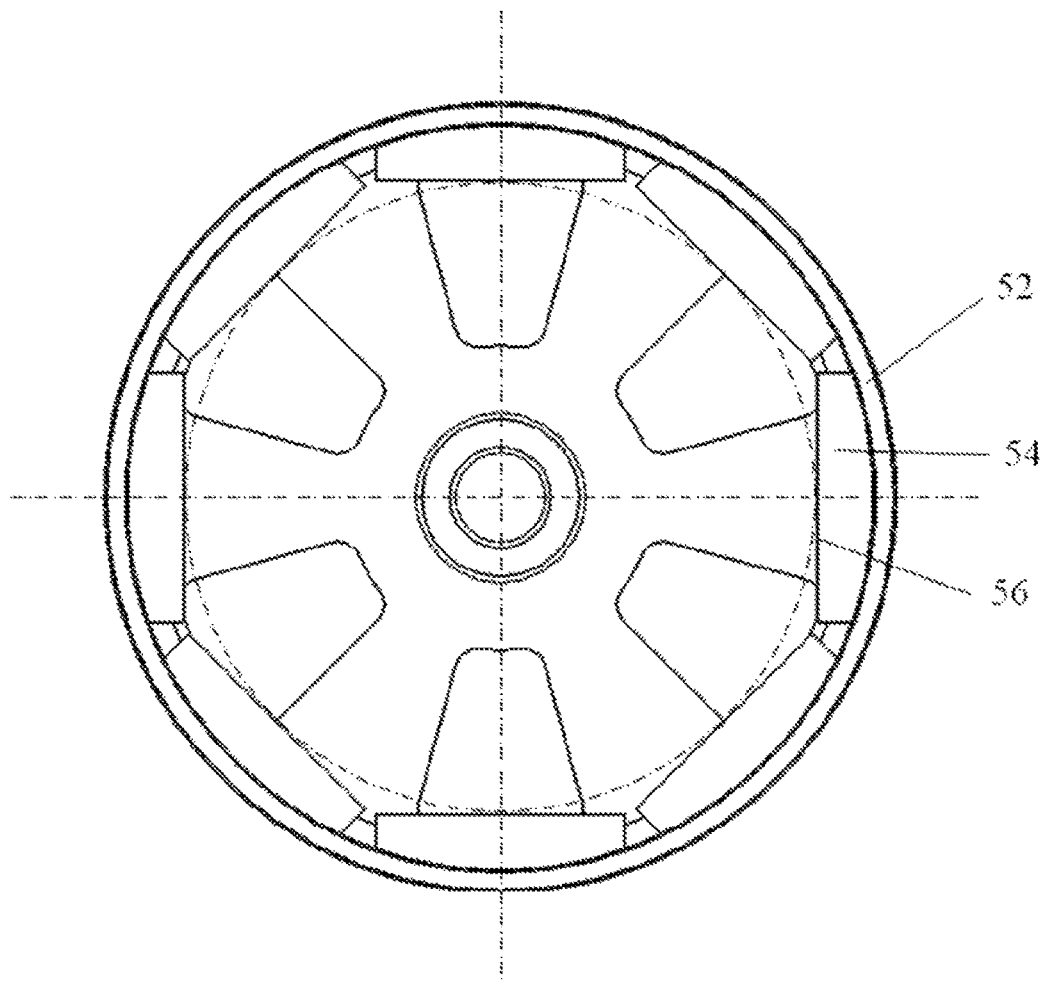
FIG. 20 illustrates a rotor according to a second embodiment.

FIG. 20 illustrates the rotor 50 according to a second embodiment. In the second embodiment, the permanent magnet 54 is symmetrical about its middle line which extends along the thickness direction of the magnet 54. The permanent magnet 54 has a thickness progressively decreasing from a circumferential center to two circumferential sides of the permanent magnet 54. The inner surface 56 of each permanent magnet 54 facing the stator 10 is a flat surface extending parallel to a tangential direction of a radial outer surface of the stator. Each permanent magnet 54 forms a permanent magnetic pole. In a radial cross-section as shown in FIG. 20, the inner surfaces of the permanent magnets 54 are located on sides of a regular polygon, respectively. As such, the gap formed between the permanent magnetic poles 54 and the stator 10 is a symmetrical uneven gap. The size of the gap has a minimum value at a position corresponding to the circumferential center of the permanent magnet 54, and progressively increases from position of the minimum value toward two circumferential sides of the permanent magnet 54. The provision of the symmetrical uneven gap facilitates positioning the rotor 50 at a position deviating from a dead-point position when the motor is powered off, such that the rotor 50 can be successfully started when the motor is energized.

Figure 21:
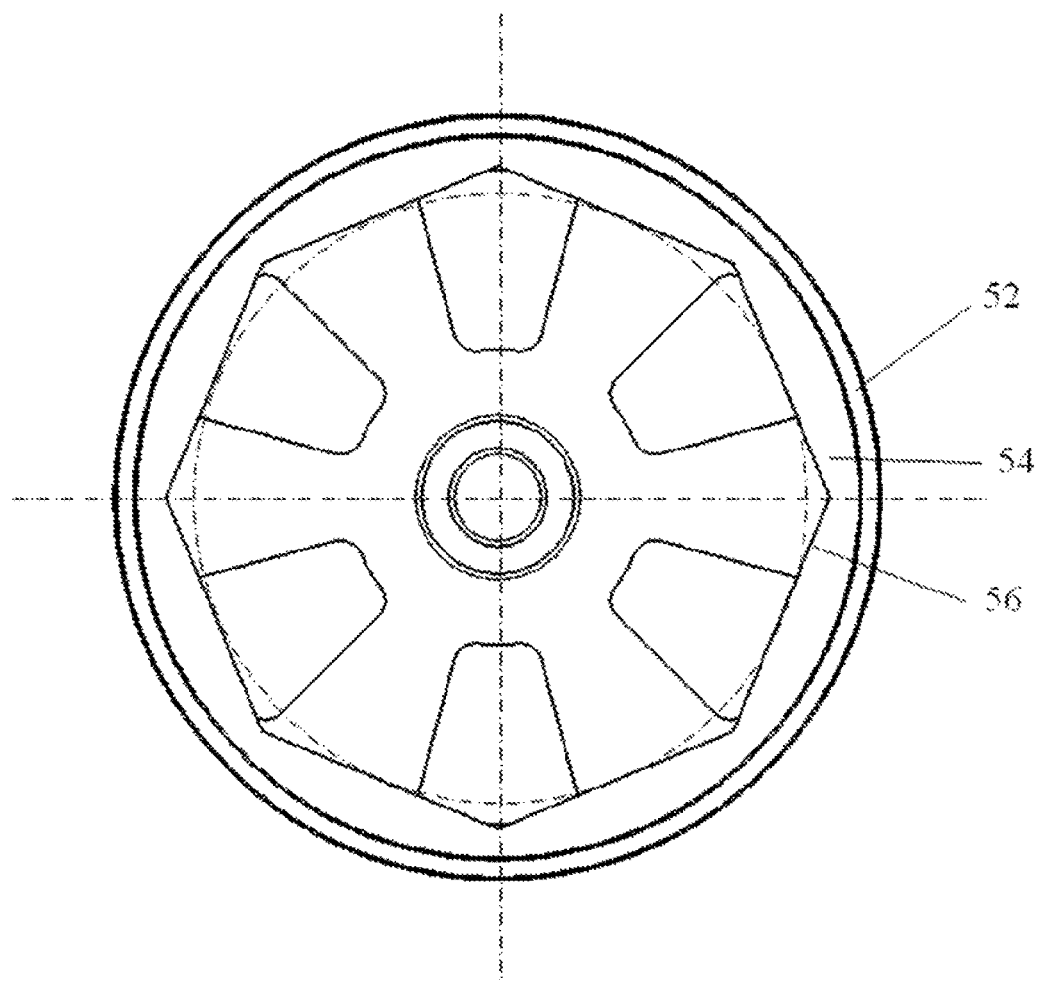
FIG. 21 illustrates a rotor according to a third embodiment.

FIG. 21 illustrates the rotor 50 according to a third embodiment, which is different from the embodiment of FIG. 20 mainly in that the permanent magnet 54 is an integral structure in the shape of a closed ring in the circumferential direction. The ring-shaped permanent magnet 54 includes a plurality of sections in the circumferential direction. Each section functions as one magnetic pole of the rotor 50, and adjacent sections have different polarities. Similar to each permanent magnet 54 of the rotor 50 of FIG. 20, each section of the permanent magnet 54 has a thickness progressively decreasing from a circumferential center to two circumferential sides. The inner surface 56 of each section facing the stator 10 is a flat surface. In a radial cross-section as shown in FIG. 21, all sections of the permanent magnet 54 cooperatively form a regular polygonal inner surface of the rotor 50. Similar to the embodiment of FIG. 20, the gap formed between each magnetic pole of the permanent magnet 54 and the outer surface of the stator 10 is a symmetrical uneven gap.

Figure 22:
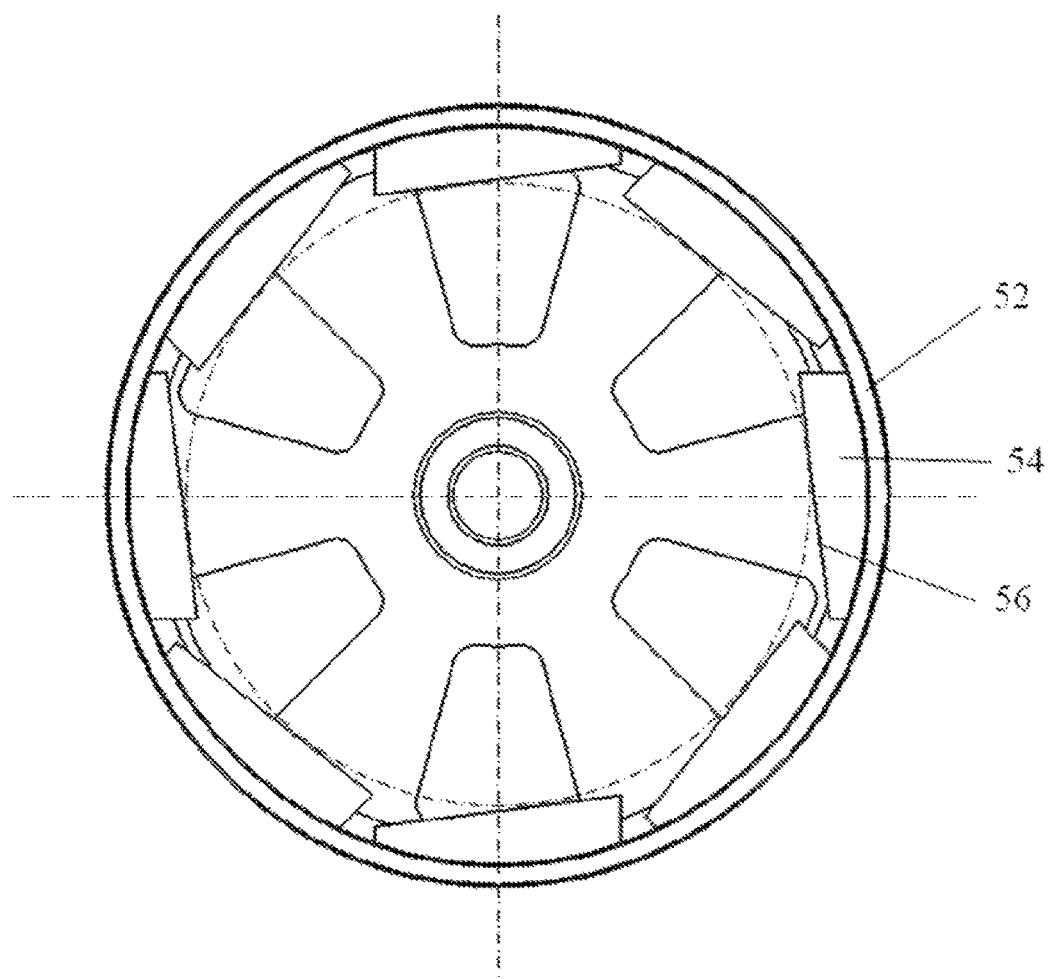
FIG. 22 illustrates a rotor according to a fourth embodiment.

FIG. 22 illustrates the rotor 50 according to a fourth embodiment, which is similar to the embodiment of FIG. 20, the rotor 50 includes a plurality of permanent magnets 54 spacingly arranged in the circumferential direction, and each permanent magnet 54 has a flat inner wall surface 56. Differently, in this embodiment, the permanent magnet 54 is an asymmetrical structure having a thickness progressively increasing from one circumferential side toward the other circumferential side, and progressively decreasing from a position adjacent the other circumferential side. The permanent magnet 54 has a maximum thickness at a position deviating from a circumferential center of the permanent magnet 54, and the two circumferential sides of the permanent magnet 54 have different thickness. Connecting lines between two end sides of the inner surface 56 of the permanent magnet 54 and a center of the rotor 50 form a un-isosceles triangle. As such, after assembled with the stator 10, the stator 10 and rotor 50 define an uneven asymmetrical gap there 1 between. The provision of the asymmetrical uneven gap facilitates positioning the rotor 50 at a position deviating from a dead-point position when the motor is powered off, such that the rotor 50 can be successfully started when the motor is energized.

Figure 23:
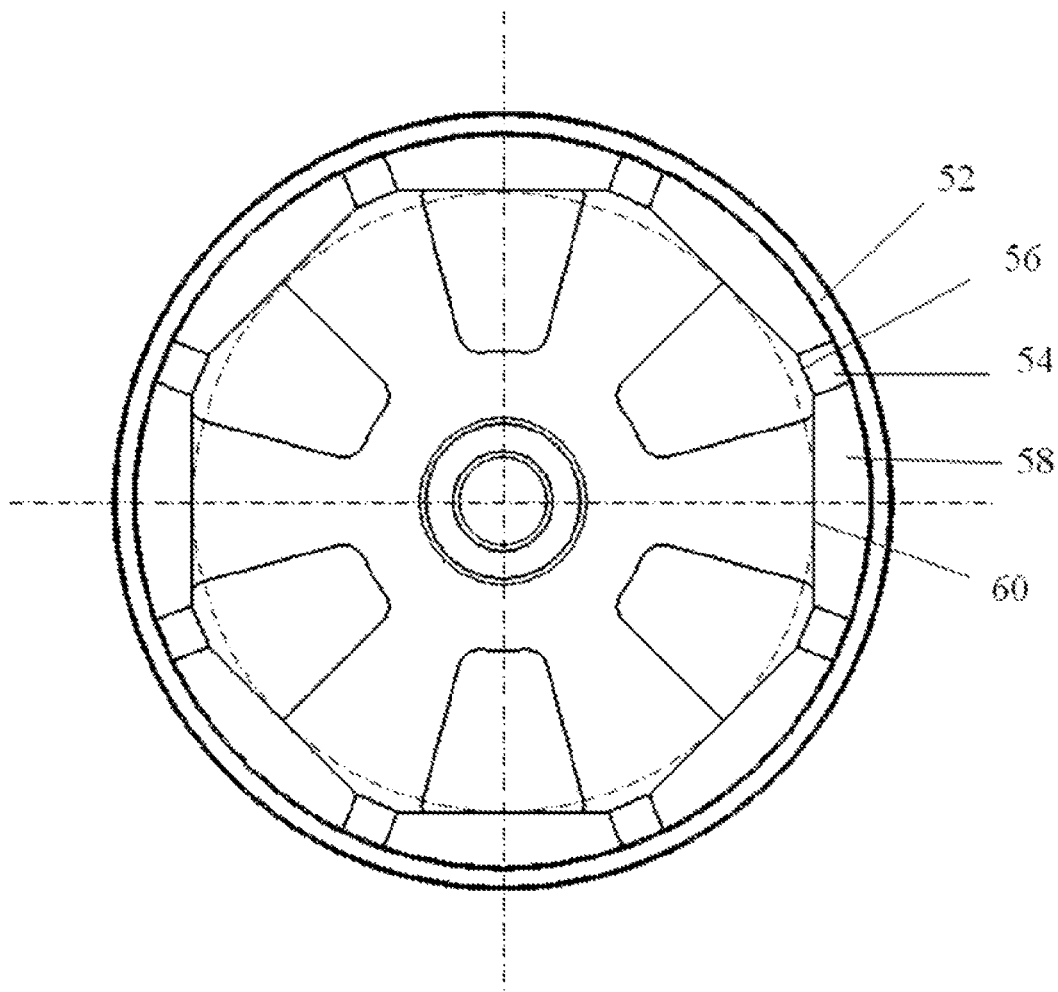
FIG. 23 illustrates a rotor according to a fifth embodiment.

FIG. 23 illustrates the rotor 50 according to a fifth embodiment. In this embodiment, the rotor 50 includes a housing 52, and a plurality of permanent magnets 54 and magnetic members 58 affixed to an inner side of the housing 52. The magnetic members 58 may be made from a hard magnetic material such as ferromagnet or rare earth magnets, or a soft magnetic material such as iron. The permanent magnets 54 and the magnetic members 58 are spacingly alternatively arranged in the circumferential direction, with one magnetic member 58 inserted between each two adjacent permanent magnets 54. In this embodiment, the permanent magnet 54 is column-shaped having a generally square cross-section. Each two adjacent permanent magnets 54 define therebetween a large space which has a circumferential width far greater than that of the permanent magnet 54. As such, the magnetic member 58 has a larger circumferential width than the permanent magnet 54, which width may be several times of the width of the permanent magnet 54.

The magnetic member 58 is symmetrical about a radius of the rotor which pass through a middle of the magnetic member 58. The magnetic member 58 has a thickness progressively decreasing from a circumferential middle/center to two circumferential sides thereof. A minimum thickness of the magnetic member 58, i.e. the thickness at its circumferential sides, is substantially the same as that of the permanent magnet 54. The inner circumferential surface 60 of the magnet member 58 facing the stator 10 is a flat surface extending parallel to a tangential direction of an outer surface of the stator 10. As such, the inner circumferential surfaces 56 of the permanent magnets 54 and the inner circumferential surfaces 60 of the magnetic members 58 collectively form the inner surface of the rotor 50 which is a symmetrical polygon in a radial cross-section of the rotor 50. After the rotor 50 is assembled with the stator 10, the gap formed between the stator 10 and the rotor 50 is a symmetrical uneven gap. Preferably, the permanent magnet 54 is magnetized along the circumferential direction, i.e. circumferential side wall surfaces of the permanent magnet 54 are polarized to have corresponding polarities. Two adjacent permanent magnets 54 have opposite polarization direction. That is, two surfaces of the two adjacent permanent magnets 54 that are opposed to each other have the same polarity. As such, the magnetic member 58 between the two adjacent permanent magnets 54 are polarized to the corresponding magnetic poles, and two adjacent magnetic members 58 have different polarities.

Motors with different characteristics can be obtained from different combinations of the above stators 10 and rotors 50, some of which are exemplified below.

Figure 24:
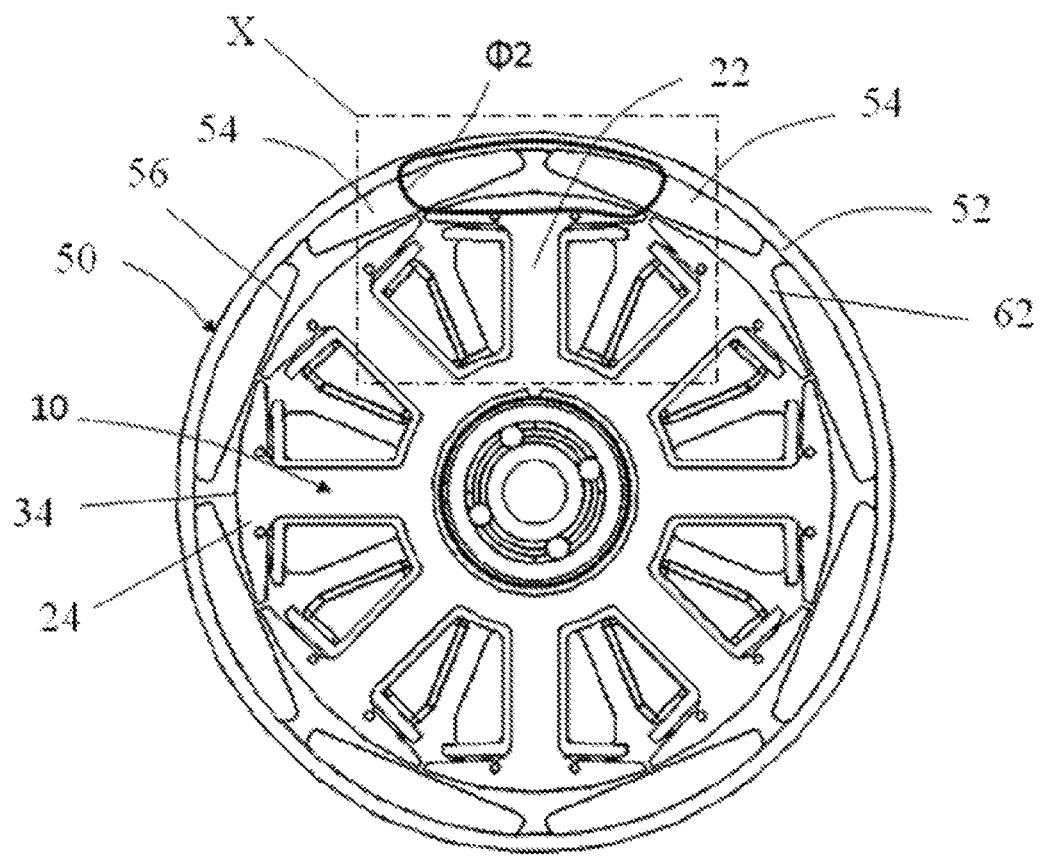
FIG. 24 illustrates a motor formed by the stator of FIGS. 1 to 4 and the rotor of FIG. 18.

FIG. 24 illustrates a motor formed by the stator 10 of the first embodiment illustrated in FIG. 1 through FIG. 4 and the rotor 50 illustrated in FIG. 20. The tooth tips 24 of the stator 10 are spaced apart in the circumferential direction to form the slot openings 30, and the outer surfaces 34 of the tooth tips 24 are located on the same cylindrical surface, such that the whole outer surface of the stator 10 is circular in shape. The permanent magnetic poles 54 of the rotor 50 are spaced apart in the circumferential direction, and the inner surface 56 of the permanent magnetic pole 54 facing the stator 10 is a flat surface, such that the whole inner surface of the rotor 50 is a regular polygon in shape. The outer surface 34 of the stator 10 and the inner surface 56 of the rotor 50 are radially spaced apart to form a gap 62. The gap 62 has a radial width varying along the circumferential direction of the permanent magnetic pole 54, which is a symmetrical uneven gap 62 which is symmetrical about the middle line of the permanent magnetic pole 54. The radial width of the gap 62 progressively increases from the circumferential center toward the two circumferential sides of the inner surface 56 of the permanent magnet 54.

Figure 25:
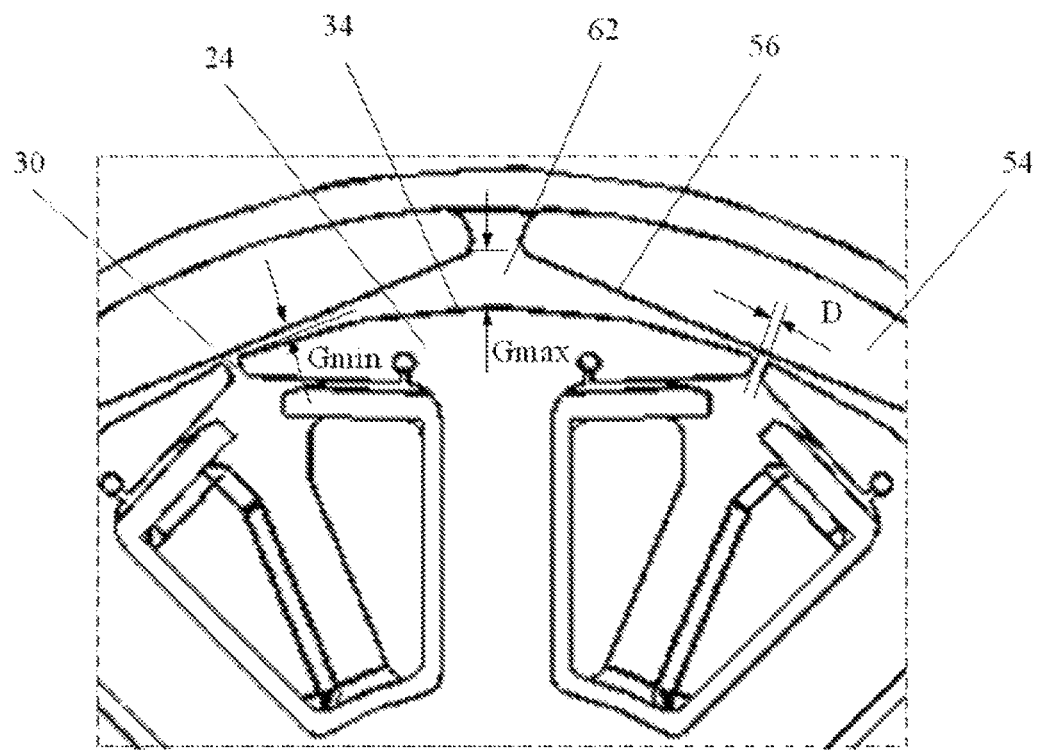
FIG. 25 is an enlarged view of the box X of FIG. 24, with the magnetic line removed for clarity.

Referring also to FIG. 25, the radial distance between the circumferential center of the inner surface 56 of the permanent magnet 54 and the outer surface 34 of the tooth tip 24 is the minimum width Gmin of the gap 62, and the radial distance between the circumferential sides of the inner surface 56 of the permanent magnet 54 and the outer surface 34 of the tooth tip 24 is the maximum width Gmax of the gap 62. Preferably, a ratio of the maximum width Gmax to the minimum width Gmin of the gap is greater than 1.5, i.e. Gmax:Gmin>1.5. More preferably, Gmax:Gmin>2. Preferably, the width D of the slot opening 30 is not greater than five times of the minimum width Gmin of the gap 62, i.e. D≤5 Gmin. Preferably, the width D of the slot opening 30 is equal to or greater than the minimum width Gmin of the gap 62, but less than or equal to three times of the minimum width Gmin of the gap 62, i.e. Gmin≤D≤3 Gmin.

Figure 26:
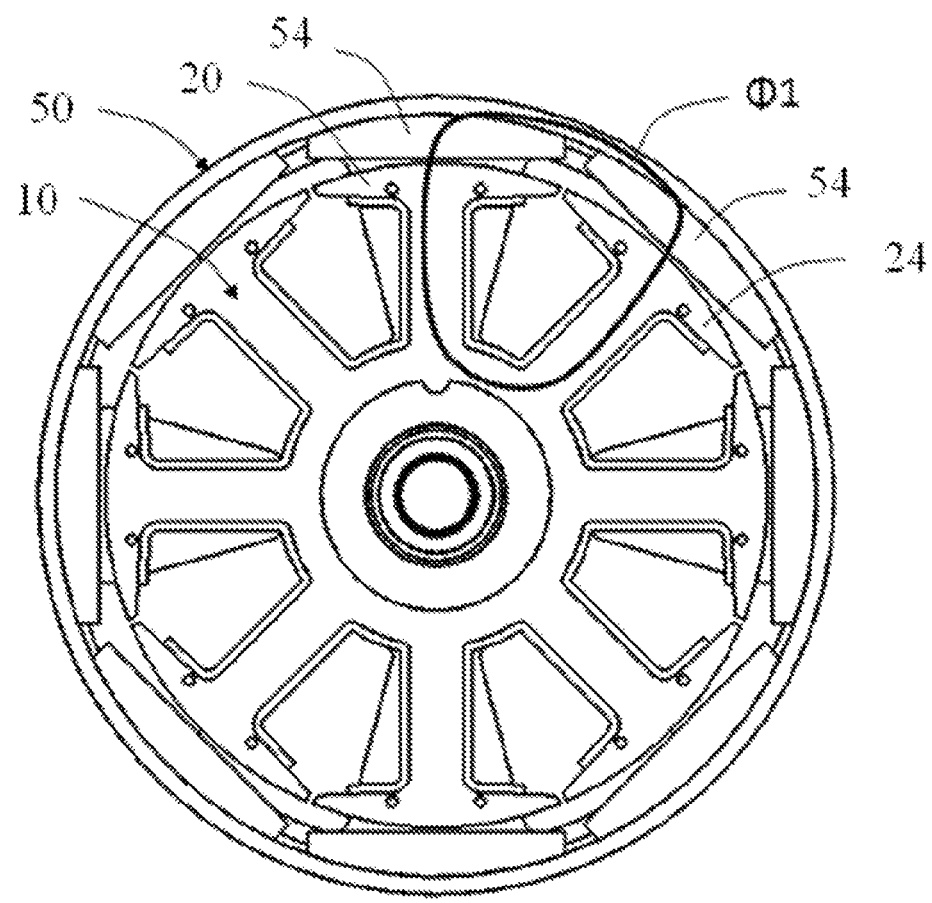
FIG. 26 illustrates a positional relationship when the motor of FIG. 24 is at a dead-point position.

Referring to FIG. 24 and FIG. 26, when the motor is not energized, the permanent magnets 54 of the rotor 50 produce an attractive force which attracts the teeth 20 of the stator 10. FIG. 24 and FIG. 26 show the rotor 50 at different positions. Specifically, FIG. 26 shows the rotor 50 in a dead-point position (i.e. a center of the magnetic pole of the rotor 50 is aligned with a center of the tooth tip 24 of the stator 10). FIG. 24 shows the rotor 50 in an initial position (i.e. the stop position of the rotor 50 when the motor is not energized or powered off). As shown in FIG. 24 and FIG. 26, the magnetic flux of the magnetic field produced by the magnetic pole of the rotor 50 that passes through the stator 10 is Φ1 when the rotor 50 is at the dead-point position, the magnetic flux of the magnetic field produced by the magnetic pole of the rotor 50 that passes through the stator 10 is Φ2 when the rotor 50 is at the initial position. Because Φ2>Φ1 and the path of Φ2 is shorter than that of Φ1 and the magnetic resistance of Φ2 is less than that of Φ1, the rotor 50 can be positioned at the initial position when the motor is not energized, thus avoiding stopping at the dead-point position shown in FIG. 24 and hence avoiding the failure of starting the rotor 50 when the motor is energized.

Referring to FIG. 24, at this initial position, the middle line of the tooth tip of the stator is closer to the middle line of the neutral area between two adjacent magnetic poles 54 than middle lines of the two adjacent magnetic poles 54. Preferably, a middle line of the tooth tip 24 of the tooth 20 of the stator 10 is aligned with the middle line of the neutral area between two adjacent permanent magnetic poles 54. This position deviates the furthest from the dead-point position, which can effectively avoid the failure of starting the rotor when the motor is energized. Due to other factors such as friction in practice, at the initial position the middle line of the tooth tip 24 may deviate from the middle line of the neutral area between two adjacent permanent magnet poles 54 by an angle such as an angle of 0 to 30 degrees, but the initial position is still far away from the dead-point position. In the above embodiments of the present invention, the rotor 50 can be positioned at the initial position deviating from the dead-point position by the leakage magnetic field produced by the permanent magnets 54 of the rotor 50 acting with the tooth tips 24 of the stator. The leakage magnetic flux produced by the permanent magnets 54 does not pass through the tooth bodies 22 and the windings 16. The cogging torque of the single-phase permanent magnet brushless motor configured as such can be effectively suppressed, such that the motor has enhanced efficiency and performance. Experiments show that a peak of the cogging torque of a single-phase outer-rotor brushless direct current motor configured as above (the rated torque is 1 Nm, the rated rotation speed is 1000 rpm, and the stack height of the stator core is 30 mm) is less than 80 mNm.

Figure 27:
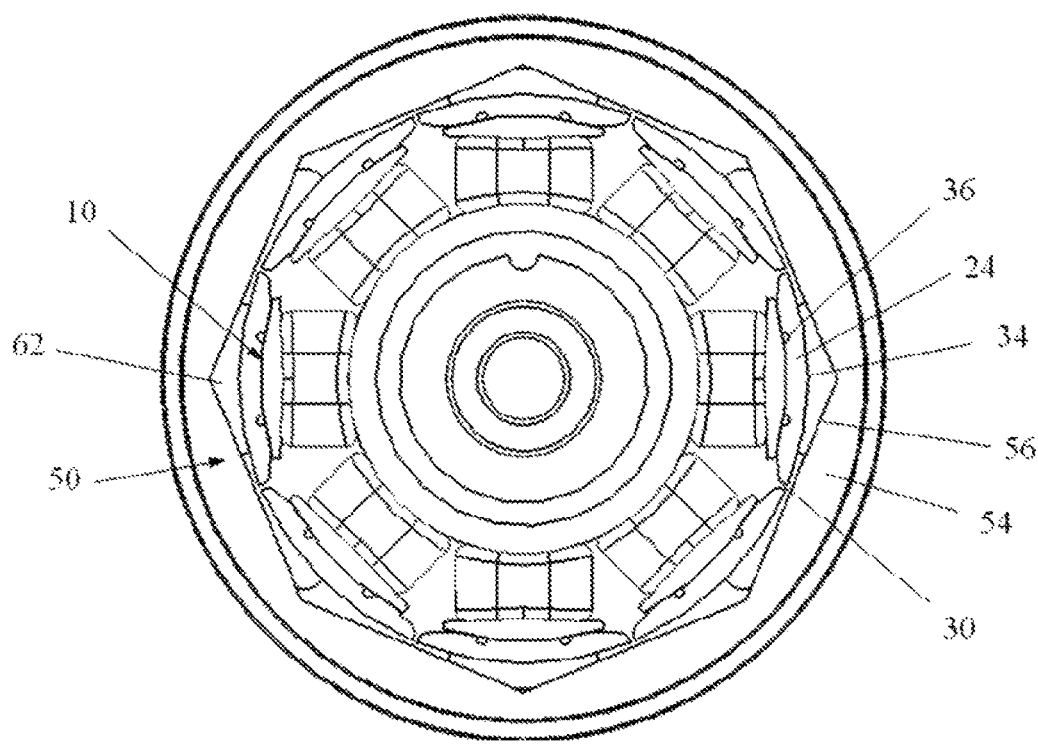
FIG. 27 illustrates a motor formed by the stator of FIGS. 1 to 4 and the rotor of FIG. 21.

FIG. 27 illustrates a motor formed by the stator 10 of the first embodiment illustrated in FIG. 1 through FIG. 4 and the rotor 50 of the third embodiment illustrated in FIG. 21. The tooth tips 24 of the stator 10 are spaced apart in the circumferential direction to form the slot openings 30, and the outer surfaces 34 of the tooth tips 24 are located on the same cylindrical surface. The permanent magnet 54 of the rotor 50 includes multiple sections connected to each other in the circumferential direction, each section functions as one magnetic pole of the rotor 50, and the inner wall surface 56 of the magnetic pole is a flat surface, such that the inner surface of the whole rotor 50 is a regular polygon in shape. The stator 10 and the rotor 50 form therebetween the symmetrical uneven gap 62, the width of the gap 62 progressively increases from two circumferential sides toward the circumferential center of each magnetic pole, with the maximum width Gmax at the circumferential center of the magnetic pole and the minimum width Gmin at the circumferential sides. When the rotor 50 is still, the center of each tooth tip 24 is aligned with a junction of two corresponding sections of the permanent magnet 54, which avoids the dead-point position to facilitate restarting of the rotor 50.

Figure 28:
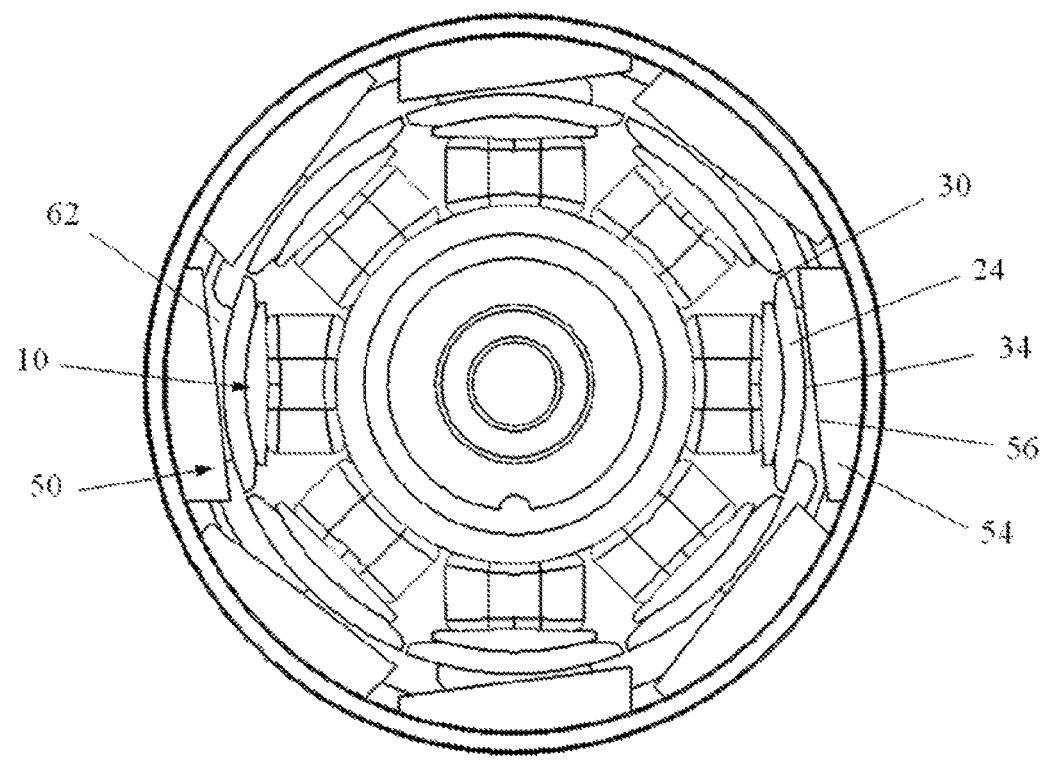
FIG. 28 illustrates a motor formed by the stator of FIGS. 9 to 10 and the rotor of FIG. 20.

FIG. 28 illustrates a motor formed by the stator 10 of the third embodiment illustrated in FIG. 9 and FIG. 10 and the rotor 50 of the fourth embodiment illustrated in FIG. 22. The tooth tips 24 of the stator 10 are spaced apart in the circumferential direction to form the slot openings 30, and the outer wall surfaces 34 of the tooth tips 24 are located on the same cylindrical surface. The permanent magnet of the rotor 50 is an asymmetrical structure having an non-uniform thickness along the circumferential direction. The inner wall surface 56 of the permanent magnet 54 of the rotor 50 is inclined an angle relative to a tangential direction of the outer wall surface 34 of the tooth tip 24, and the inner wall surface 56 of the permanent magnet 54 and the outer wall surface 34 of the tooth tip 24 define therebetween an uneven asymmetrical gap 62. The width of the gap 62 firstly progressively decreases from one circumferential side toward the other circumferential side of the permanent magnet 54, and then progressively increases. Taking the orientation illustrated in the drawings as an example, the gap 62 has the maximum width Gmax at a clockwise side of the permanent magnet 54, and the minimum width Gmin of the gap 62 is at a position adjacent but deviating from a counterclockwise side of the permanent magnet 54.

Figure 29:
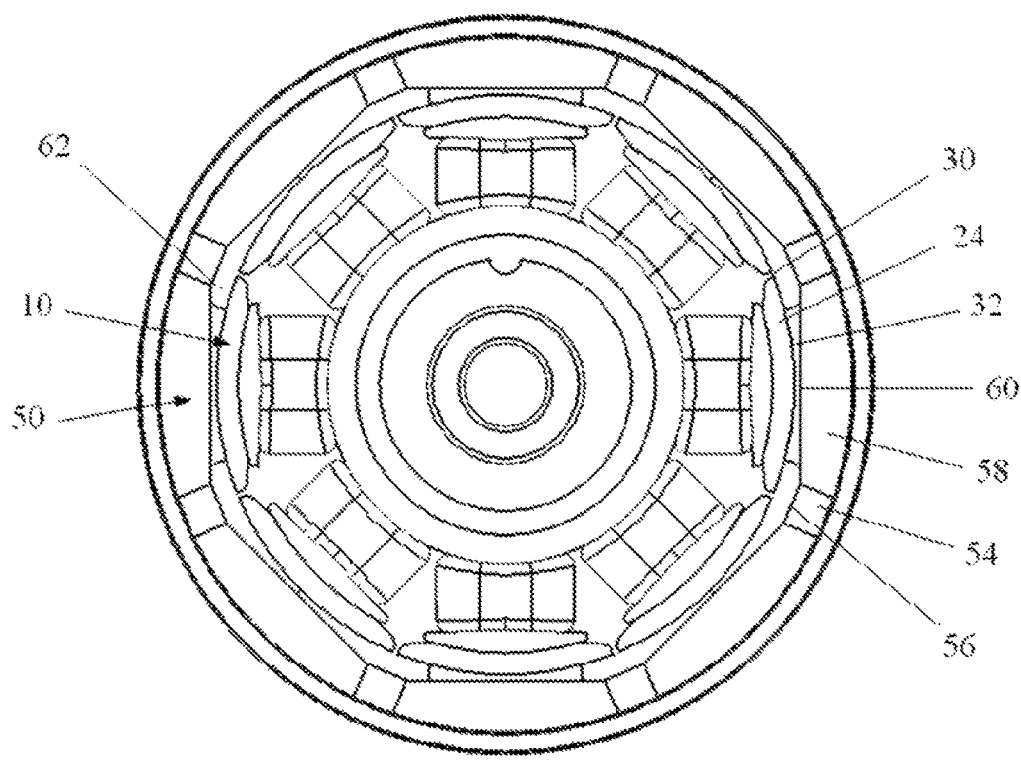
FIG. 29 illustrates a motor formed by the stator of FIGS. 9 to 10 and the rotor of FIG. 23.

FIG. 29 illustrates a motor formed by the stator 10 of the third embodiment illustrated in FIG. 9 and FIG. 10 and the rotor 50 of the fifth embodiment illustrated in FIG. 23. The tooth tips 24 of the stator 10 are spaced apart in the circumferential direction to form the slot openings 30, and the outer surfaces 34 of the tooth tips 24 are located on the same cylindrical surface. The rotor 50 includes the permanent magnets 54 and the magnetic members 58 that are spacingly alternatively arranged in the circumferential direction. The inner surfaces 56 of the permanent magnets 54 and the inner surfaces 60 of the magnetic members 58 collectively form the polygonal inner surface of the rotor 50. The stator 10 and the rotor 50 form therebetween a symmetrical uneven gap 62, which has a size progressively decreasing from a circumferential center to two circumferential sides of the magnetic member 58, and reaches the maximum width Gmax at the position corresponding to the permanent magnet 54. The rotor 50 is capable of being positioned at the initial position by leakage magnetic flux circuits each of which passes through a permanent magnetic pole 54, two adjacent magnetic members 58 and a corresponding tooth tip 24. At the initial position, a center of the permanent magnet 54 is radially aligned with a center of the tooth tip 24, such that the permanent magnet 54 applies a circumferential force on the stator 10 to facilitate the start of the rotor 50.

Figure 30:
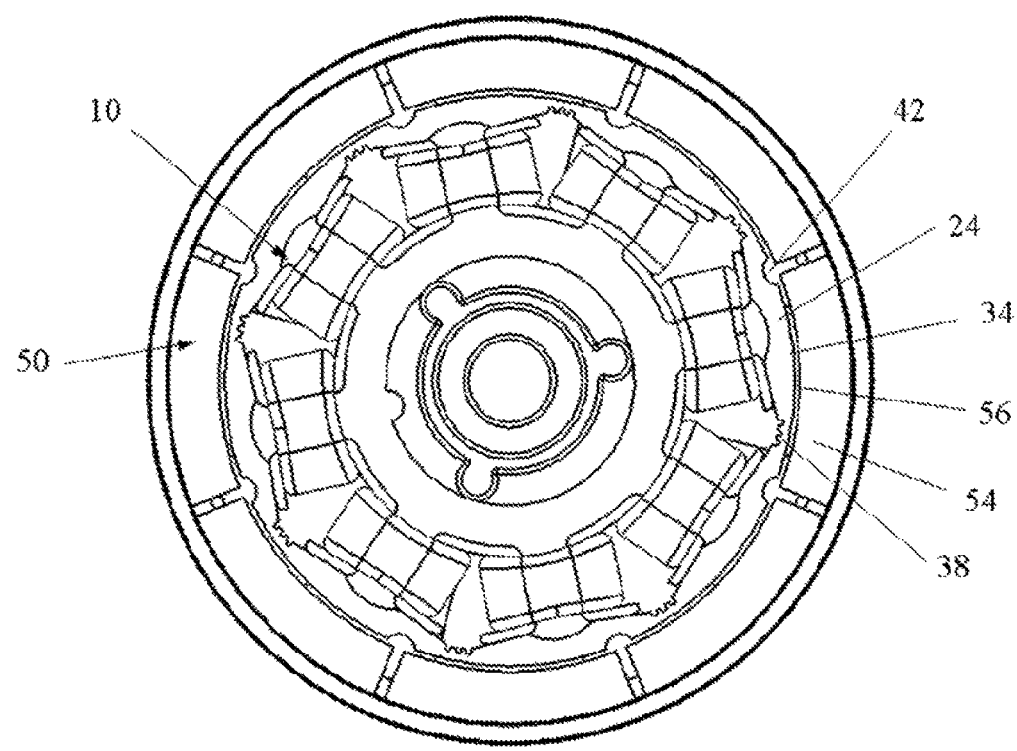
FIG. 30 illustrates a motor formed by the stator of FIG. 18 and the rotor of FIG. 19.

FIG. 30 illustrates a motor formed by the stator 10 illustrated in FIG. 17 and the rotor 50 illustrated in FIG. 19. The tooth tips 24 of the stator 10 are connected to each other in the circumferential direction, and the whole outer surface of the stator 10, i.e. the outer wall surface 34 of the tooth tip 24 is a cylindrical surface. The inner surface of the rotor 50, i.e. the inner wall surfaces 56 of the permanent magnets 54, are located on a cylindrical surface coaxial with the outer wall surface 34 of the stator 10. The outer wall surface 34 of the stator 10 and the inner wall surface 56 of the rotor 50 define an even gap 62. The outer wall surface 34 of the tooth tip 24 is provided with positioning grooves 42, which makes the tooth tip 24 have an asymmetrical structure, thereby ensuring that, when the rotor 50 is still, a center line of the area between two adjacent permanent magnets 54 deflects an angle relative a center line of the tooth tip 24 of the tooth 20 of the stator 10. Preferably, when the rotor is still, the positioning slot 42 of the stator 10 is aligned with the center line of the two adjacent permanent magnets 54 of the rotor 50, which enables the rotor 50 to successfully start each time the motor is energized. Understandably, in this embodiment, the tooth tips 24 of the stator 10 may be separated from each other via a narrow slot opening in the circumferential direction.

Figure 31:
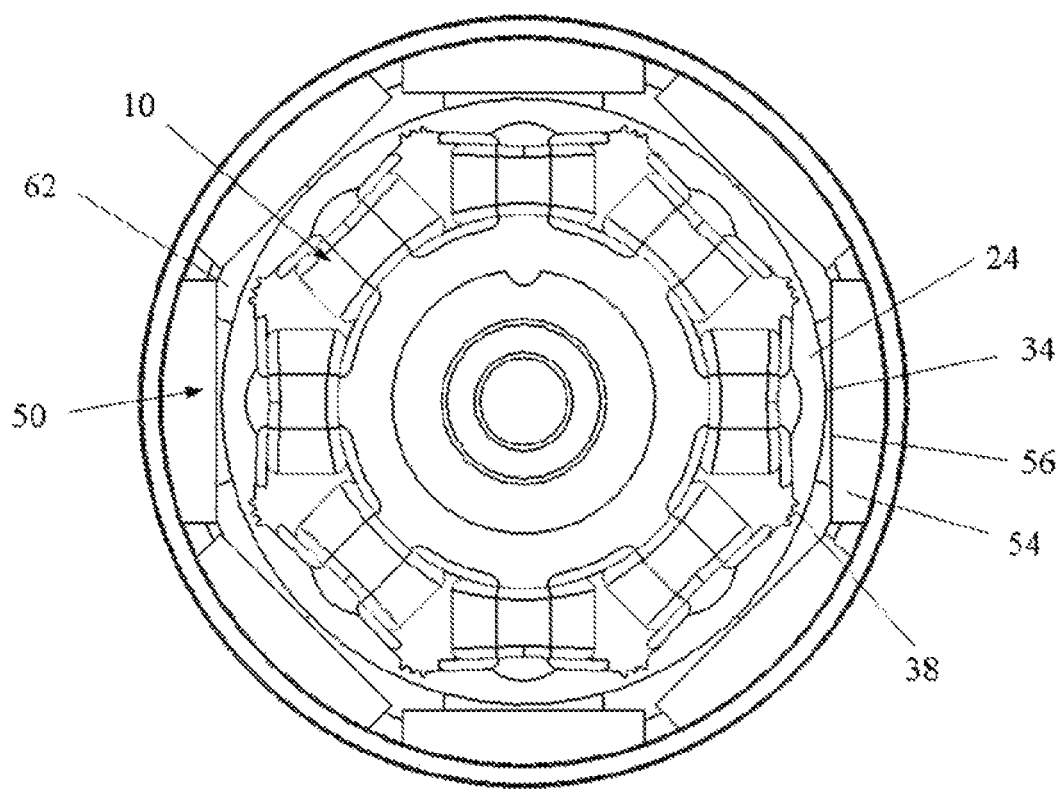
FIG. 31 illustrates a motor formed by the stator of FIG. 17 and the rotor of FIG. 18.

FIG. 31 illustrates a motor formed by the stator 10 of the sixth embodiment illustrated in FIG. 15 and the rotor 50 of the second embodiment illustrated in FIG. 20. The tooth tips 24 of the stator 10 are connected to each other in the circumferential direction, and the whole outer surface of the stator 10 is a cylindrical surface. The inner wall surface 56 of the permanent magnet 54 of the rotor 50 is a flat surface extending parallel to a tangential direction of an outer surface of the stator 10. The inner wall surface 56 of the permanent magnet 54 and the outer wall surface 34 of tooth tip 24 form therebetween an symmetrical uneven gap 62. The width of the gap 62 progressively decreases from a circumferential center to two circumferential sides of the permanent magnet 54, with a minimum width Gmin at the circumferential center of the permanent magnet 54 and a maximum width Gmax at the two circumferential sides.

Figure 32:
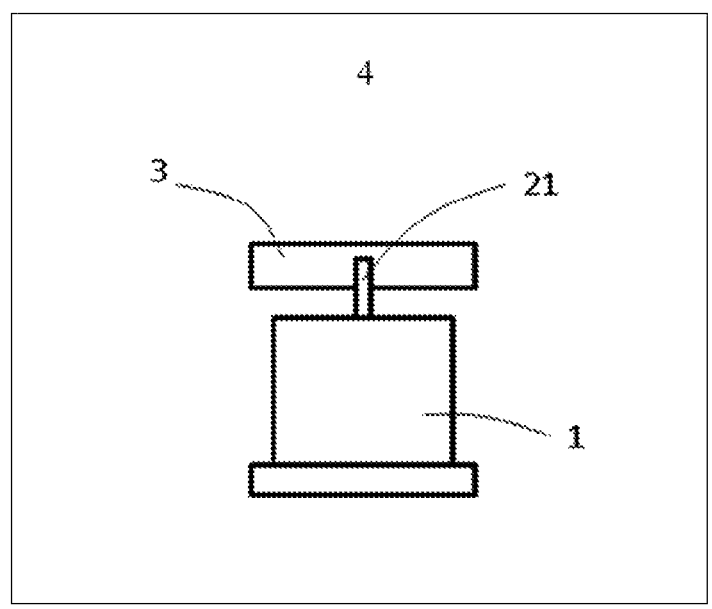
FIG. 32 illustrates the motor 1 of the present invention employed in an electric apparatus.

FIG. 32 illustrates the motor 1 of the present invention employed in an electric apparatus 4 according to another embodiment. The electric apparatus 4 may be a range hood, a ventilation fan, or an air conditioner which comprises an impeller 3 driven by the rotor shaft 21 of the motor. The electric apparatus 4 may also be a washing machine or a dry machine which comprises a speed reducing device 3 driven by the rotor 50 of the motor.

It should be understood that the stators 10 of FIG. 1 through FIG. 11 are substantially the same in construction and characteristics, which form narrow slot openings or even have no slot openings, and which can be interchanged to realize the same function when combined with the rotor 50. In addition, depending on the different gaps formed between the stator and rotor and depending on the symmetry and asymmetry of the stator and rotor structures, suitable circuits can be designed to enable the rotor 50 to successfully start when the motor is energized. It should be understood that combinations of the stator 10 and the rotor 50 is not limited to the embodiments exemplified above. Various modifications without departing from the spirit of the present invention fall within the scope of the present invention. Therefore, the scope of the invention is to be determined by reference to the claims that follow.

The invention claimed is:

1. A stator for a single-phase outer-rotor motor, comprising a stator core, the stator core including:
   a yoke; and
   a plurality of teeth extending outwardly from an outer edge of the yoke, each of the teeth including:
   a tooth body connected with the yoke, a winding slot formed between each two adjacent tooth bodies; and
   a tooth tip formed at a distal end of the tooth body, a slot opening formed between each two adjacent tooth tips, the tooth tip having a width in a circumferential direction greater than that of the tooth body and thus protruding beyond the tooth body in the circumferential direction, inner surfaces of at least part of the tooth tips facing the stator being formed with cutting grooves such that a portion of the tooth tip outside the cutting groove is capable of being tilted outwardly to enlarge the slot opening and deformed inwardly to narrow the slot opening;
   wherein the tooth tips of a half of the plurality of the teeth are formed with the cutting grooves, the tooth tips of the other half of the plurality of the teeth are not formed with the cutting grooves, and the tooth tips with the cutting grooves and the tooth tips without the cutting grooves are spacingly and alternatively arranged in the circumferential direction.

2. The stator for a single-phase outer-rotor motor of claim 1, wherein the portion of the tooth tip outside the cutting groove has a deformation angle of 15° to 60°.

3. The stator for a single-phase outer-rotor motor of claim 1, wherein the portion of the tooth tip outside the cutting groove has a deformation angle of 20° to 45°.

4. The stator for a single-phase outer-rotor motor of claim 1, wherein the cutting groove is formed in a connecting area between the tooth tip and the tooth body.

5. The stator for a single-phase outer-rotor motor of claim 1, wherein the cutting groove is located adjacent the tooth body and spaced from the tooth body.

6. The stator for a single-phase outer-rotor motor of claim 1, wherein each of the tooth tips is formed with the cutting groove.

7. The stator for a single-phase outer-rotor motor of claim 1, wherein there is only one cutting groove is formed on the tooth tip, and a single side of the tooth tip is tilted outwardly before the tooth tip is forced to bend to form the stator core.

8. The stator for a single-phase outer-rotor motor of claim 1, wherein the number of the cutting grooves on the tooth tip is two, the two cutting grooves are located at opposite sides of the tooth body, and both sides of the tooth tip are tilted outwardly before the tooth tip is forced to bend inwardly to form the stator core.

9. The stator for a single-phase outer-rotor motor of claim 1, wherein the stator further comprises windings wound around the stator core, the portion of the tooth tip outside the cutting groove is tilted outwardly before the windings are wound around the stator core; after the windings are wound around the stator core, the tilted portion of the tooth tip deforms to bend inwardly to form the stator core.

10. A stator for a single-phase outer-rotor motor, comprising:
    a stator core including:
    a yoke; and
    a plurality of teeth extending outwardly from an outer edge of the yoke, each of the teeth including a tooth body connected with the yoke and a tooth tip formed at a distal end of the tooth body, the tooth tip having a width greater than that of the tooth body, two circumferential sides of the tooth tip extending beyond the tooth body to respectively form two wing portions, a slot opening being formed between adjacent wing portions of each two adjacent tooth tips; and
    windings wound around the tooth bodies;
    wherein at least one of two wing portions adjacent each slot opening is tilted outwardly before the windings are wound, and the tilted wing portion is deformed to bend inwardly to form the stator core after the windings are wound;
    wherein the wing portions of each of the tooth tips of a half of the plurality of the teeth are both tilted outwardly, neither of the wing portions of the tooth tips of the other half of the plurality of the teeth are tilted outwardly, and the tooth tips with the tilted wing portions and the tooth tips without the tilted wing portions are spacingly and alternatively arranged in the circumferential direction.

11. A stator for a single-phase outer-rotor motor, comprising:
    a stator core including:
    a yoke; and
    a plurality of teeth extending outwardly from an outer edge of the yoke, each of the teeth including a tooth body connected with the yoke and a tooth tip formed at a distal end of the tooth body, the tooth tip having a width greater than that of the tooth body, two circumferential sides of the tooth tip extending beyond the tooth body to respectively form two wing portions, a slot opening being formed between adjacent wing portions of each two adjacent tooth tips; and
    windings wound around the tooth bodies;
    wherein at least one of two wing portions adjacent each slot opening is tilted outwardly before the windings are wound, and the tilted wing portion is deformed to bend inwardly to form the stator core after the windings are wound;
    wherein before the windings are wound, one of the wing portions of each tooth tip is tilted outwardly, the other of the wing portions of each tooth tip is not tilted outwardly, and all the tilted wing portions are located at the same side of the tooth bodies.

12. The stator for a single-phase outer-rotor motor of claim 11, wherein the tilted wing portion is formed with a cutting groove and, after the windings are wound, the tilted wing portion deforms to bend inwardly to reduce or eliminate the cutting groove.

13. An electric apparatus comprising a single-phase motor, the motor comprising:
a stator including:
a stator core with a plurality of teeth and windings wound on the teeth, each of the teeth including a tooth body and a tooth tip extending from a distal end of the tooth body in a circumferential direction, two circumferential sides of the tooth tip extending beyond the tooth body to respectively form two wing portions, a slot opening formed between adjacent ends of adjacent wing portions of each two adjacent tooth tips; and
windings wound around the tooth bodies; and
a rotor comprising a yoke surrounding the stator and at least one permanent magnet disposed inside the housing to form a plurality of magnetic poles, inner surfaces of the magnetic poles facing outer surfaces of the tooth tips with a gap formed therebetween;
wherein at least one of two wing portions adjacent each slot opening is capable of being tilted outwardly to widen the slot opening and form a tilted wing portion before the windings are wound, and the tilted wing portion is capable of being deformed inwardly to narrow the slot opening after the windings are wound;
wherein when the motor is de-energized the rotor is capable of being positioned at an initial position by a leakage magnetic field generated by the magnetic poles acting with the tooth tips of the stator.

14. The electric apparatus of claim 13, wherein a width of the narrowed slot opening in the circumferential direction is less than or equal to five times of a minimum radial width of the gap.

15. The electric apparatus of claim 14, wherein the width of the slot opening in the circumferential direction is less than or equal to three times of the minimum width of the gap.

16. The electric apparatus of claim 13 is a range hood, an air conditioner or a ventilation fan which further comprises an impeller driven by the rotor.

17. The electric apparatus of claim 13 is a washing machine or dry machine which further comprises a speed reducing device driven by the rotor.

18. The electric apparatus of claim 13, wherein a ratio of a maximum width to the minimum width of the gap is greater than two.

19. The electric apparatus of claim 13, wherein there are a plurality of the permanent magnets spacingly and evenly arranged in the circumferential direction, and each of the permanent magnets has a pole-arc coefficient greater than 0.7.

20. The electric apparatus of claim 13, wherein a radial width of the gap corresponding to each magnetic pole progressively increases from a middle portion toward circumferential ends of the magnetic pole.

\* \* \* \* \*